(12) United States Patent
Xu et al.

(10) Patent No.: US 11,800,518 B2
(45) Date of Patent: Oct. 24, 2023

(54) TECHNIQUES FOR PHYSICAL DOWNLINK CONTROL CHANNEL (PDCCH) LIMITS FOR MULTIPLE CELLS SCHEDULING ONE CELL IN A WIRELESS COMMUNICATION SYSTEM

(71) Applicant: QUALCOMM Incorporated, San Diego, CA (US)

(72) Inventors: Huilin Xu, San Diego, CA (US); Seyedkianoush Hosseini, San Diego, CA (US); Hung Dinh Ly, San Diego, CA (US); Jing Lei, San Diego, CA (US); Wanshi Chen, San Diego, CA (US); Peter Pui Lok Ang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 17/152,477

(22) Filed: Jan. 19, 2021

(65) Prior Publication Data
US 2021/0227563 A1    Jul. 22, 2021

Related U.S. Application Data

(60) Provisional application No. 62/964,556, filed on Jan. 22, 2020.

(51) Int. Cl.
*H04W 72/12* (2023.01)
*H04L 1/00* (2006.01)
(Continued)

(52) U.S. Cl.
CPC ....... *H04W 72/1273* (2013.01); *H04L 1/0038* (2013.01); *H04L 27/26025* (2021.01);
(Continued)

(58) Field of Classification Search
CPC ........... H04W 72/1273; H04W 72/042; H04W 72/0446; H04W 72/1257; H04L 1/0038;
(Continued)

(56) References Cited

U.S. PATENT DOCUMENTS 10,165,582 B2 * 12/2018 Papasakellariou ...... H04L 5/003
10,321,398 B2    6/2019 Dinan
(Continued)

FOREIGN PATENT DOCUMENTS

| EP | 2302830 A2 | 3/2011 |
| EP | 3240224 A1 | 11/2017 |
| EP | 3547596 A1 | 10/2019 |

OTHER PUBLICATIONS

Huawei, et al., "Remaining Issues for Physical Downlink Control Channel", 3GPP Draft, 3GPP TSG RAN WG1 Meeting #95, R1-1812181, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051554040, 15 Pages, Retrieved from the Internet: URL: http://www.3gpp.org/ftp/Meetings%5F3GPP%5FSYNC/RAN1/Docs/R1%2D1812181%2Ezip. [retrieved on Nov. 11, 2018] Sect. 3.1 table 2.
(Continued)

*Primary Examiner* — Hoang-Chuong Q Vu
(74) *Attorney, Agent, or Firm* — Arent Fox, LLP

(57) ABSTRACT

Aspects described herein relate to physical downlink control channel (PDCCH) limits for multiple cells scheduling one cell in fifth generation new radio (5G NR). In an example, the aspects may include determining a PDCCH limit corresponding to at least one of a number of blind detections (BDs) and a number of control channel elements (CCEs) used for decoding PDCCH candidates for a first cell that schedules a second cell, and at least a third cell that schedules the second cell, wherein the third cell is the same
(Continued)

cell as the second cell or the third cell is different from the second cell; and receiving one or more PDCCH transmissions from the first cell and the third cell based on the PDCCH limit.

61 Claims, 11 Drawing Sheets

(51) Int. Cl.
  *H04W 72/04* (2023.01)
  *H04L 27/26* (2006.01)
  *H04W 72/1273* (2023.01)
  *H04W 72/0446* (2023.01)
  *H04W 72/23* (2023.01)
  *H04W 72/50* (2023.01)

(52) U.S. Cl.
  CPC ....... *H04W 72/0446* (2013.01); *H04W 72/23* (2023.01); *H04W 72/535* (2023.01)

(58) Field of Classification Search
  CPC . H04L 27/26025; H04L 5/0053; H04L 5/001; H04L 5/0035
  See application file for complete search history.

(56) References Cited

U.S. PATENT DOCUMENTS

| | | | | |
|---|---|---|---|---|
| 2013/0183987 A1* | 7/2013 | Vrzic | ................... | H04L 1/0046 455/450 |
| 2014/0105158 A1* | 4/2014 | Kim | ....................... | H04L 1/001 370/329 |
| 2015/0208366 A1* | 7/2015 | Papasakellariou | .. | H04W 52/146 370/311 |
| 2015/0304086 A1* | 10/2015 | Kim | ....................... | H04L 5/001 370/329 |
| 2017/0310447 A1* | 10/2017 | Kusashima | ....... | H04W 72/0406 |
| 2019/0246409 A1* | 8/2019 | Kim | ..................... | H04B 7/0626 |
| 2019/0349155 A1* | 11/2019 | Xu | ........................ | H04L 5/0042 |
| 2019/0357238 A1* | 11/2019 | Zhou | ..................... | H04W 72/23 |
| 2021/0014837 A1* | 1/2021 | Papasakellariou | .... | H04W 72/23 |
| 2021/0022122 A1* | 1/2021 | Khoshnevisan | ...... | H04L 5/0053 |
| 2021/0029726 A1* | 1/2021 | Papasakellariou | .. | H04W 72/535 |
| 2021/0037502 A1* | 2/2021 | Tsai | ....................... | H04L 5/001 |
| 2021/0144599 A1* | 5/2021 | Awoniyi-Oteri | ............................. H04W 36/0083 |
| 2021/0144746 A1* | 5/2021 | Ji | .......................... | H04L 1/0045 |
| 2021/0160002 A1* | 5/2021 | Salah | .................. | H04W 72/048 |
| 2021/0227514 A1* | 7/2021 | Takeda | .................... | H04L 5/001 |
| 2021/0314927 A1* | 10/2021 | Noh | ..................... | H04B 7/0617 |
| 2021/0320821 A1* | 10/2021 | Lee | ....................... | H04L 5/0053 |
| 2021/0385826 A1* | 12/2021 | Moon | .................. | H04L 5/0007 |
| 2022/0104201 A1* | 3/2022 | Takeda | .................. | H04W 72/02 |
| 2022/0116969 A1* | 4/2022 | He | ..................... | H04W 72/0446 |
| 2022/0150734 A1* | 5/2022 | Nimbalker | ............ | H04W 24/08 |
| 2022/0225393 A1* | 7/2022 | Gao | ........................ | H04L 5/001 |
| 2022/0264486 A1* | 8/2022 | Hu | ....................... | H04L 1/0038 |
| 2022/0294578 A1* | 9/2022 | Kim | ........................ | H04L 5/005 |
| 2022/0369138 A1* | 11/2022 | Matsumura | ....... | H04W 72/1273 |

OTHER PUBLICATIONS

International Search Report and Written Opinion—PCT/US2021/014247—ISA/EPO—dated Apr. 7, 2021.

* cited by examiner

TECHNIQUES FOR PHYSICAL DOWNLINK CONTROL CHANNEL (PDCCH) LIMITS FOR MULTIPLE CELLS SCHEDULING ONE CELL IN A WIRELESS COMMUNICATION SYSTEM

CROSS-REFERENCE TO RELATED APPLICATION(S)

The present application claims benefit of U.S. Provisional Application No. 62/964,556 entitled "TECHNIQUES FOR PHYSICAL DOWNLINK CONTROL CHANNEL (PDCCH) LIMITS FOR MULTIPLE CELLS SCHEDULING ONE CELL IN A WIRELESS COMMUNICATION SYSTEM" filed Jan. 22, 2020, which is assigned to the assignee hereof and hereby expressly incorporated by reference herein.

BACKGROUND

Aspects of the present disclosure relate generally to wireless communication systems, and more particularly, to physical downlink control channel (PDCCH) limits for multiple cells scheduling one cell in fifth generation new radio (5G NR).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, some implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication, including determining a physical downlink control channel (PDCCH) limit, the PDCCH limit corresponding to at least one of a number of blind detections (BDs) and a number of control channel elements (CCEs) used for decoding PDCCH candidates for a first cell that schedules a second cell, and for at least a third cell that schedules the second cell, wherein the third cell is the same cell as the second cell or the third cell is different from the second cell; and receiving one or more PDCCH transmissions from the first cell and the third cell based on the PDCCH limit.

In a further example, an apparatus for wireless communication is provided that includes a transceiver, a memory configured to store instructions, and one or more processors communicatively coupled with the transceiver and the memory. The one or more processors are configured to execute the instructions to determine a PDCCH limit, the PDCCH limit corresponding to at least one of a number of BDs and a number of CCEs used for decoding PDCCH candidates for a first cell that schedules a second cell, and for at least a third cell that schedules the second cell, wherein the third cell is the same cell as the second cell or the third cell is different from the second cell; and receive one or more PDCCH transmissions from the first cell and the third cell based on the PDCCH limit.

In another aspect, an apparatus for wireless communication is provided that includes means for determining a PDCCH limit, the PDCCH limit corresponding to at least one of a number of BDs and a number of CCEs used for decoding PDCCH candidates for a first cell that schedules a second cell, and for at least a third cell that schedules the second cell, wherein the third cell is the same cell as the second cell or the third cell is different from the second cell; and means for receiving one or more PDCCH transmissions from the first cell and the third cell based on the PDCCH limit.

In yet another aspect, a non-transitory computer-readable medium is provided including code executable by one or more processors to determine a PDCCH limit, the PDCCH limit corresponding to at least one of a number of BDs and a number of CCEs used for decoding PDCCH candidates for a first cell that schedules a second cell, and for at least a third cell that schedules the second cell, wherein the third cell is the same cell as the second cell or the third cell is different from the second cell; and receive one or more PDCCH transmissions from the first cell and the third cell based on the PDCCH limit.

Another example implementation includes a method of wireless communication, including determining a PDCCH limit, the PDCCH limit corresponding to at least one of a number of BDs and a number of CCEs used for decoding PDCCH candidates for a first cell that schedules a second cell, and at least a third cell that schedules the second cell, wherein the third cell is the same cell as the second cell or the third cell is different from the second cell; and transmitting one or more PDCCH transmissions from the first cell and the third cell based on the PDCCH limit.

In a further example, an apparatus for wireless communication is provided that includes a transceiver, a memory configured to store instructions, and one or more processors communicatively coupled with the transceiver and the memory. The one or more processors are configured to execute the instructions to determine a PDCCH limit, the PDCCH limit corresponding to at least one of a number of BDs and a number of CCEs used for decoding PDCCH candidates for a first cell that schedules a second cell, and for at least a third cell that schedules the second cell, wherein the third cell is the same cell as the second cell or the third cell is different from the second cell; and transmit one or more PDCCH transmissions from the first cell and the third cell based on the PDCCH limit.

In another aspect, an apparatus for wireless communication is provided that includes means for determining a PDCCH limit, the PDCCH limit corresponding to at least one of a number of BDs and a number of CCEs used for decoding PDCCH candidates for a first cell that schedules a second cell, and for at least a third cell that schedules the second cell, wherein the third cell is the same cell as the second cell or the third cell is different from the second cell; and means for transmitting one or more PDCCH transmissions from the first cell and the third cell based on the PDCCH limit.

In yet another aspect, a non-transitory computer-readable medium is provided including code executable by one or more processors to determine a PDCCH limit, the PDCCH limit corresponding to at least one of a number of BDs and a number of CCEs used for decoding PDCCH candidates for a first cell that schedules a second cell, and for at least a third cell that schedules the second cell, wherein the third cell is the same cell as the second cell or the third cell is different from the second cell; and transmit one or more PDCCH transmissions from the first cell and the third cell based on the PDCCH limit.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
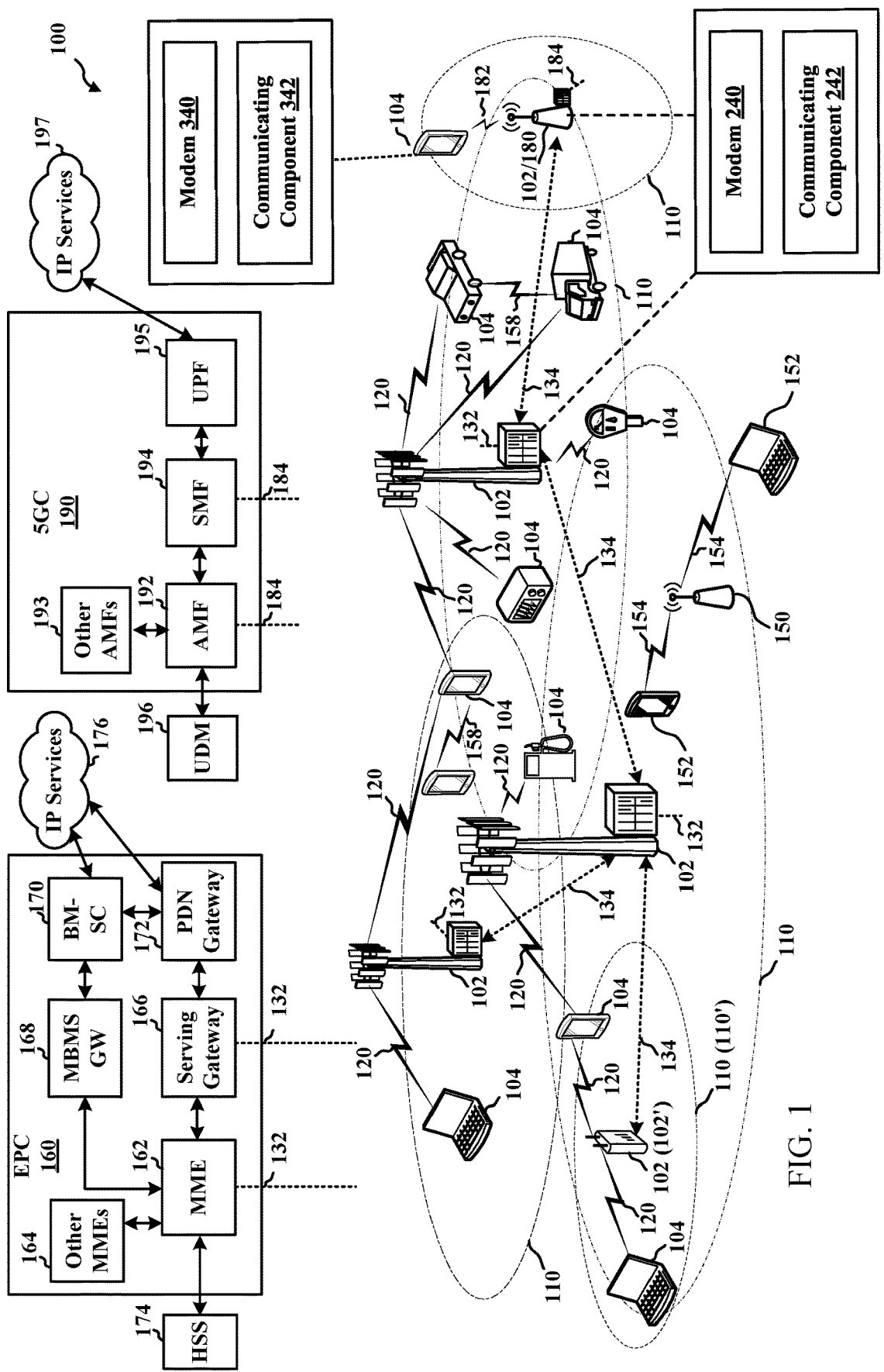
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to PDCCH limits for multiple cells scheduling one cell based on a reference scheduling cell in fifth generation new radio (5G NR). For example, in LTE, a serving cell can only be scheduled by a single scheduling cell. In an instance, if the scheduling cell is the serving cell itself, then the process is referred to as self-scheduling. In other instances, if the scheduling cell is not the serving cell, then the process is referred to as cross-carrier scheduling.

In an aspect, a benefit arises from enabling a serving cell to be scheduled by multiple cells (e.g., greater than or equal to two cells). For example, if a secondary cell data is cross-carrier scheduled by non-fallback downlink control information (DCIs) (e.g., 0-1, 1-1) in another cell, the secondary cell data may also be self-scheduled by fallback DCIs (e.g., 0-0, 1-0) in itself. In another aspect, a primary cell data is cross-carrier scheduled by non-fallback DCIs (e.g., 0-1, 1-1) in another cell, all of the other DCIs including group common DCIs and DCIs for broadcast data scheduling are still received in the primary cell. Accordingly, multiple scheduling of one cell allows for a more flexible control resource utilization for carrier aggregation.

The present disclosure relates generally to current issues of PDCCH limits for multiple cells scheduling one cell based on a reference scheduling cell. For example, in an aspect, the present disclosure includes a method, apparatus, and non-statutory computer readable medium for wireless communications for determining a PDCCH limit corresponding to at least one of a number of BDs and a number of CCEs used for decoding PDCCH candidates for a first cell that schedules a second cell, and at least a third cell that schedules the second cell, wherein the third cell is the same cell as the second cell or the third cell is different from the second cell; and receiving one or more PDCCH transmissions from the first cell and the third cell based on the PDCCH limit.

In one implementation, the present implementations determine a PDCCH limit corresponding to at least one of a number of BDs and a number of CCEs based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell. The present implementations further receive one or more PDCCH transmissions for the first cell from the second cell and the at least a third cell based on the PDCCH limit.

The described features will be presented in more detail below with reference to FIGS. 1-11.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes such as base station 102/gNB 180, may have a modem 240 and communicating component 242 for determining PDCCH limits for a cell scheduled by multiple cells, as described herein. Though a base station 102/gNB 180 is shown as having the modem 240 and communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for determining PDCCH limits for a cell scheduled by multiple cells, as described herein. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 7:
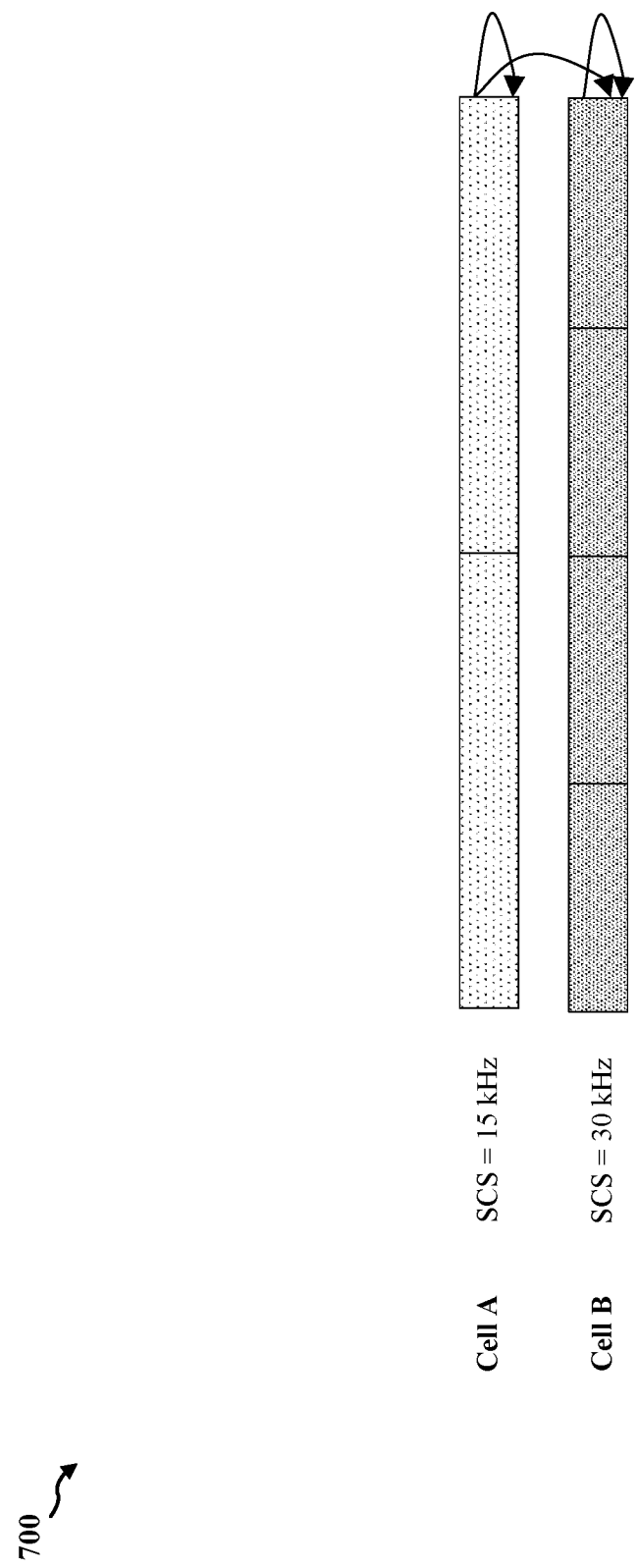
FIG. 7 is a diagram illustrating another example of cross-scheduling and self-scheduling among two cells with different SCS.
Figure 8:
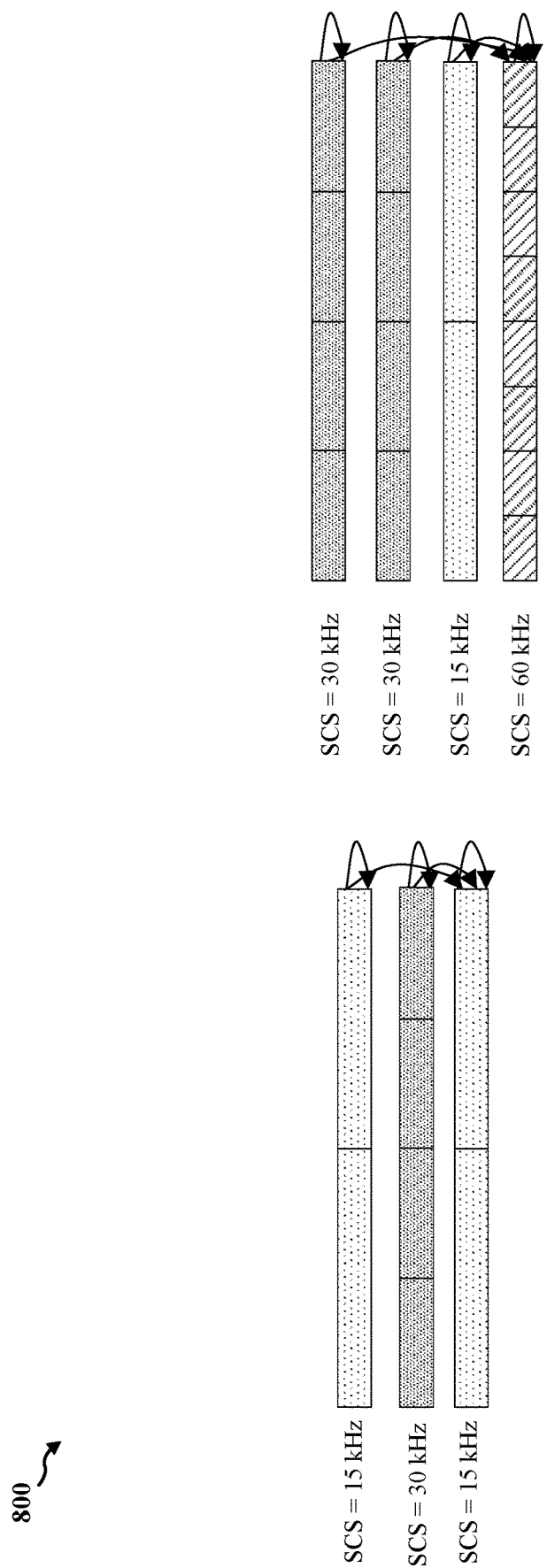
FIG. 8 is a diagram illustrating an example of multiple cross-scheduling and self-scheduling among multiple cells with different SCS.
Figure 9:
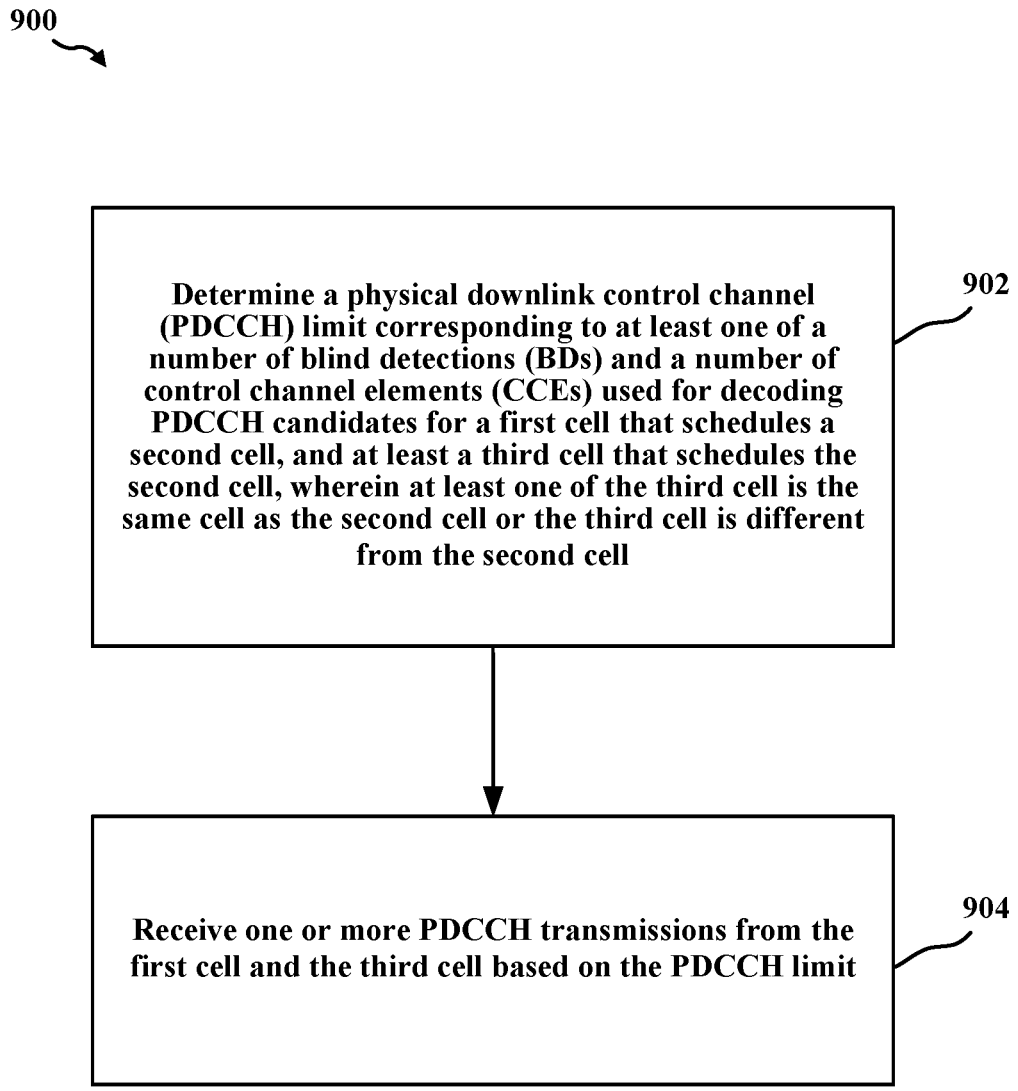
FIG. 9 is a flowchart of a method of wireless communication, and more specifically physical downlink control channel (PDCCH) limits for multiple cells scheduling one cell based on a reference scheduling cell.

Turning now to FIGS. 2-10, aspects are depicted with reference to one or more components and one or more methods that may perform the actions or operations described herein, where aspects in dashed line may be optional. Although the operations described below in FIG. 9 is presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
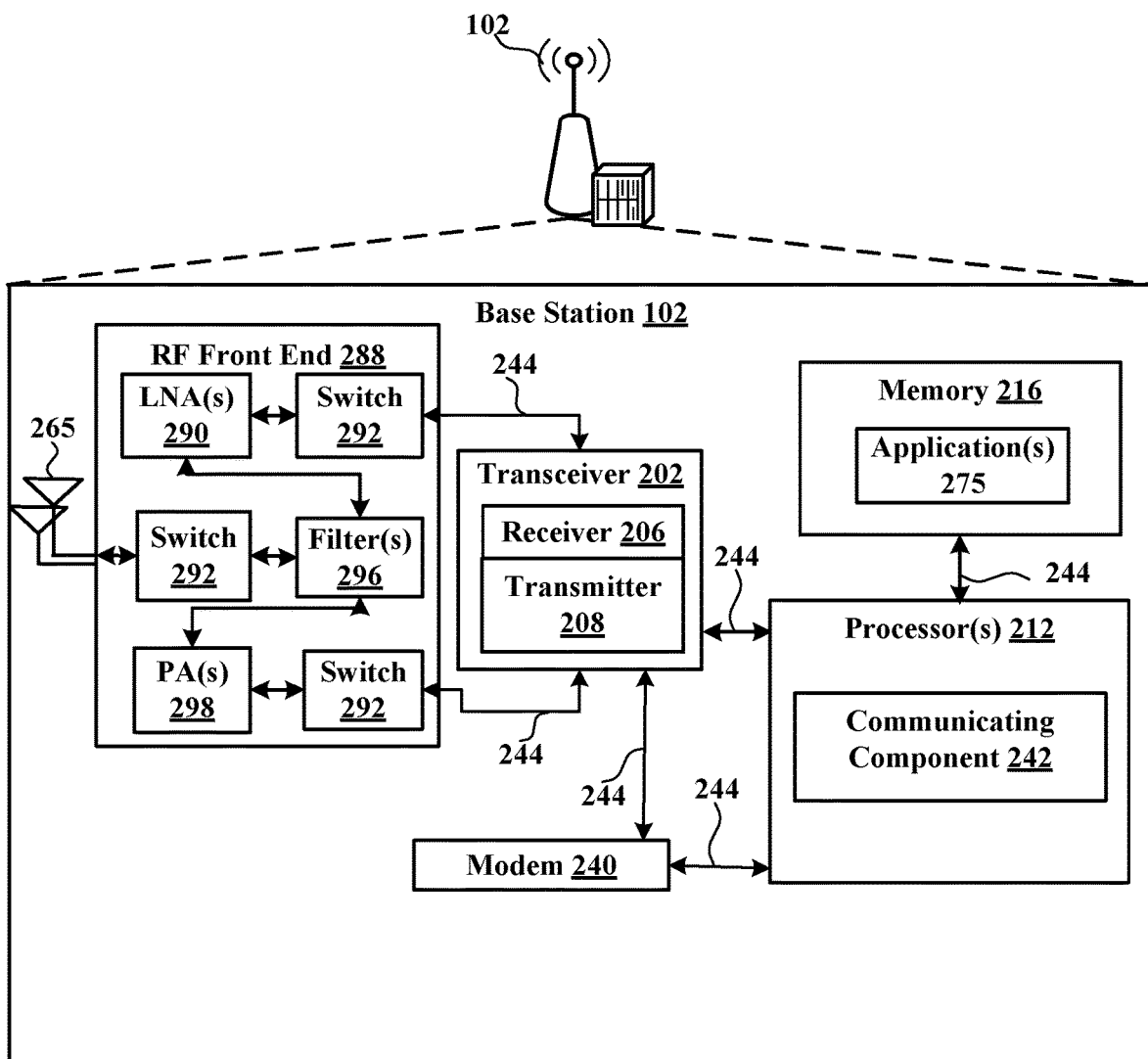
FIG. 2 is a block diagram illustrating an example of a network entity (also referred to as a base station), in accordance with various aspects of the present disclosure.

Referring to FIG. 2, one example of an implementation of a node acting as an IAB node, such as base station 102 (e.g., a base station 102 and/or gNB 180, as described above) may include a variety of components, some of which have already been described above and are described further herein, including components such as one or more processors 212 and memory 216 and transceiver 202 in communication via one or more buses 244, which may operate in conjunction with modem 240 and/or communicating component 242 for beam configurations based on QCL indications.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when base station 102 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the UE in FIG. 10. Similarly, the memory 216 may correspond to the memory described in connection with the UE in FIG. 11.

Figure 3:
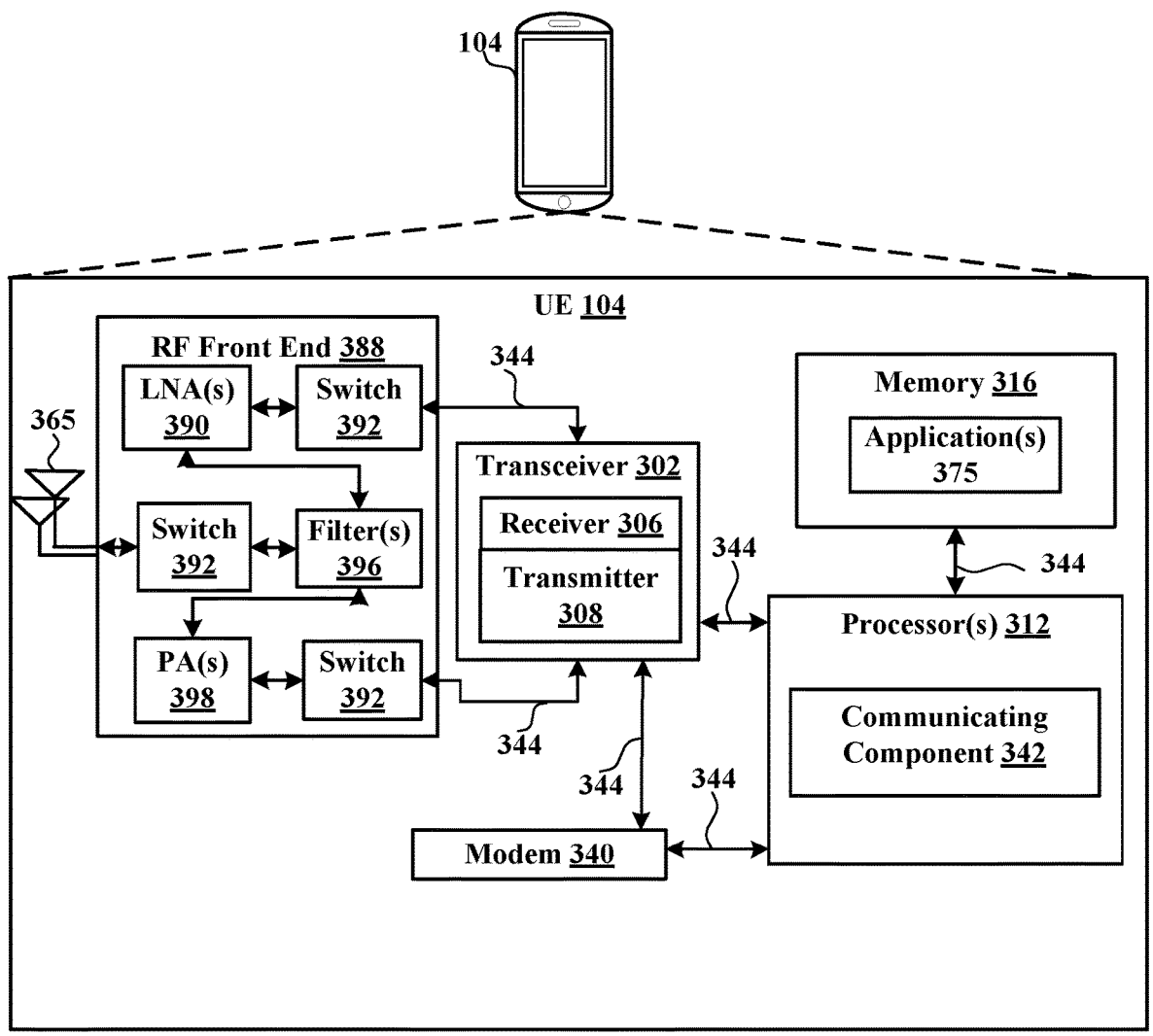
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In an aspect, the processor(s) 312 may correspond to one or more of the processors described in connection with the base station in FIG. 11. Similarly, the memory 316 may correspond to the memory described in connection with the base station in FIG. 11.

Figure 4:
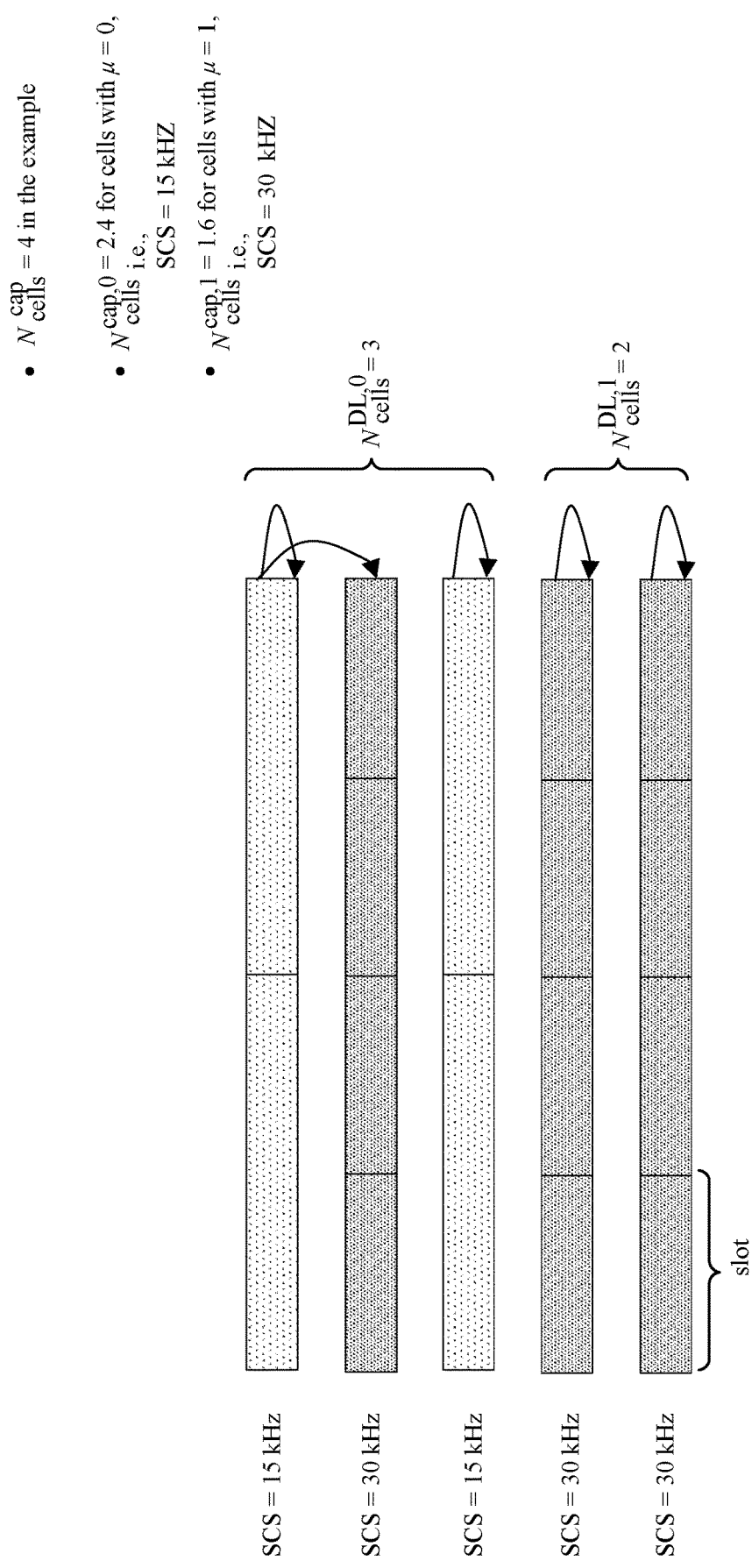
FIG. 4 is a diagram illustrating an example of cross-scheduling and self-scheduling between different cells.

FIG. 4 is a diagram 400 illustrating an example of cross-scheduling and self-scheduling between different cells. In an aspect, when NR-dual connectivity (DC) is configured to the UE, the PDCCH limit is separately determined for each cell group (CG) separately. For example, a UE, such as UE 104, may determine the reference number of configured downlink (DL) cells, $N_{cells}^{cap}$.

In an aspect, at a first step, when the UE is not configured with NR-DC and if the UE reports the PDCCH blind decode capability message (e.g., pdcch-BlindDetectionCA), then $N_{cells}^{cap}$ is equal to the value of pdcch-BlindDetectionCA. In an example, the capability applies to both the BD limit and the PDCCH limit. In another aspect, when the UE is configured with NR-DC, for each CG (e.g., master cell group (MCG), secondary cell group (SCG), etc.), $N_{cells}^{cap}$ equals the value of the reference number of cells for the CG that is provided by the network (e.g., pdcch-BlindDetection-MCG for the MCG and pdcch-BlindDetectionSCG for the SCG).

In an aspect, at a second step, the UE may determine a reference number of cells, $N_{cells}^{cap,\mu}$ for the set of cells with the same numerology configuration μ (e.g., μ may be 0, 1, 2 and 3 corresponding to subcarrier spacing 15, 30, 60 and 120 kHz, respectively). For example, the UE proportionally splits $N_{cells}^{cap}$ across different sets of cells associated with different μ values based on the number of configured DL cells that has the numerology factor μ:

$$N_{cells}^{cap,\mu} = N_{cells}^{cap} \cdot N_{cells}^{DL,\mu} / N_{cells}^{DL}$$

wherein $N_{cells}^{DL,\mu}$ is the number of configured DL cells that has μ, and $$N_{cells}^{DL} = \sum_{j=0}^{3} N_{cells}^{DL,j}$$

is the number of all configured DL cells.

In an aspect, at a third step, the UE determines that the total PDCCH BD limit and CCE limit for the set of cells associated with the same numerology factor μ. For example, the total PDCCH BD limit (e.g., the maximum total number of BDs the UE is expected to process for this set of cells per slot) is:

$$M_{PDCCH}^{total,slot,\mu} = \lfloor N_{cells}^{cap,\mu} \cdot M_{PDCCH}^{max,slot,\mu} \rfloor$$

Further, in an example, the total PDCCH CCE limit (e.g., the maximum total number of non-overlapped CCEs the UE is expected to process for this set of cells per slot) is:

$$C_{PDCCH}^{total,slot,\mu} = \lfloor N_{cells}^{cap,\mu} \cdot C_{PDCCH}^{max,slot,\mu} \rfloor$$

wherein $M_{PDCCH}^{max,slot,\mu}$ and $C_{PDCCH}^{max,slot,\mu}$ are the maximum numbers of monitored PDCCH candidates and non-overlapped CCEs that the UE is expected to process in a single cell per slot which are defined as the single cell PDCCH BD limit and CCE limit, respectively. In an example, μ is the numerology configured for the active bandwidth portion (BWP) of a cell if the cell is activated and μ is the numerology configured for the first BWP to be activated for a de-activated cell. In a further example, the monitored PDCCH candidate may be equivalent to the BD.

In an aspect, at a fourth step, the UE determines the per cell PDCCH BD limit and CCE limit for each scheduled DL cell that is associated with the numerology factor μ based on the maximum number of BDs the UE is expected to process in a slot for each cell associated with numerology factor μ is $\min(M_{PDCCH}^{total,slot,\mu}, M_{PDCCH}^{max,slot,\mu})$, and the maximum number of non-overlapped CCEs the UE is expected to process in a slot for each cell associated with numerology factor μ is $\min(C_{PDCCH}^{total,slot,\mu}, C_{PDCCH}^{max,slot,\mu})$.

In an aspect, if the UE does not report pdcch-BlindDetectionCA, as mentioned in the first step, the reference number of cells is $N_{cells}^{cap}$=number of configured DL cells, $$\left(\text{i.e., } N_{cells}^{cap} = \sum_{j=0}^{3} N_{cells}^{DL,j}\right).$$

According to the second step, the reference number of cells for numerology μ is $N_{cells}^{cap,\mu} = N_{cells}^{DL,\mu}$ (i.e., the number of configured DL cells having numerology μ). According to the third step, the total BD/CCE limit in a slot for the set of cells associated with μ is $M_{PDCCH}^{total,slot,\mu} = N_{cells}^{DL,\mu} \cdot M_{PDCCH}^{max,slot,\mu}$ and $C_{PDCCH}^{total,slot,\mu} = N_{cells}^{DL,\mu} \cdot C_{PDCCH}^{max,slot,\mu}$. Additionally in the third step, the per cell BD/CCE limit in a slot for each cell associated with μ is $\min(M_{PDCCH}^{total,slot,\mu}, M_{PDCCH}^{max,slot,\mu}) = M_{PDCCH}^{max,slot,\mu}$ and $\min(C_{PDCCH}^{total,slot,\mu}, C_{PDCCH}^{max,slot,\mu}) = C_{PDCCH}^{max,slot,\mu}$. In this example, the per cell limit is defined. As long as the per cell limit is satisfied for each configured DL cell having μ, the total limit is always satisfied for each set of configured DL cells having μ. This also applies to the case that the UE reports pdcch-BlindDetectionCA and the total number of configured DL cells $N_{cells}^{DL} \le N_{cells}^{cap}$. For example, the UE is configured with 4 cells but reports a capability value of 5.

Figure 5:
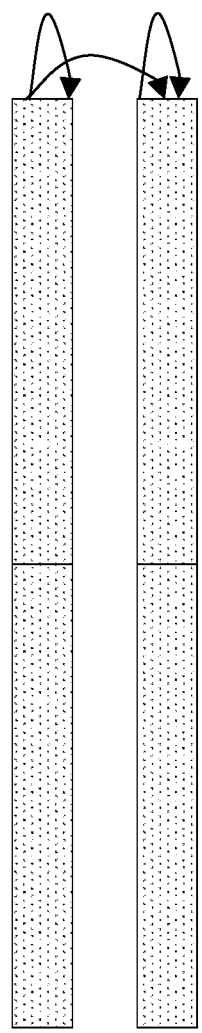
FIG. 5 is a diagram illustrating an example of cross-scheduling and self-scheduling among two cells with the same subcarrier spacing (SCS)

FIG. 5 is a diagram 500 illustrating an example of cross-scheduling and self-scheduling among two cells with the same subcarrier spacing (SCS). For example, the UE does not report pdcch-BlindDetectionCA or the total number of configured DL cells being less than a reference number of DL cells (e.g., $N_{cells}^{DL} \le N_{cells}^{cap}$). In an example, one cell (e.g., cell B) is scheduled by two cells (e.g., itself and another cell (cell A)). In this example, both cells have the same SCS.

In an aspect, the single cell BD limit $M_{PDCCH}^{max,slot,\mu}$ and CCE limit $C_{PDCCH}^{max,slot,\mu}$ are the maximum number of BDs and CCEs that the UE is expected to process in any slot n for decoding PDCCH candidates for cell B that are received in cell A in slot n, and PDCCH candidates for cell B that are received in cell B in the same slot n, respectively.

Figure 6:
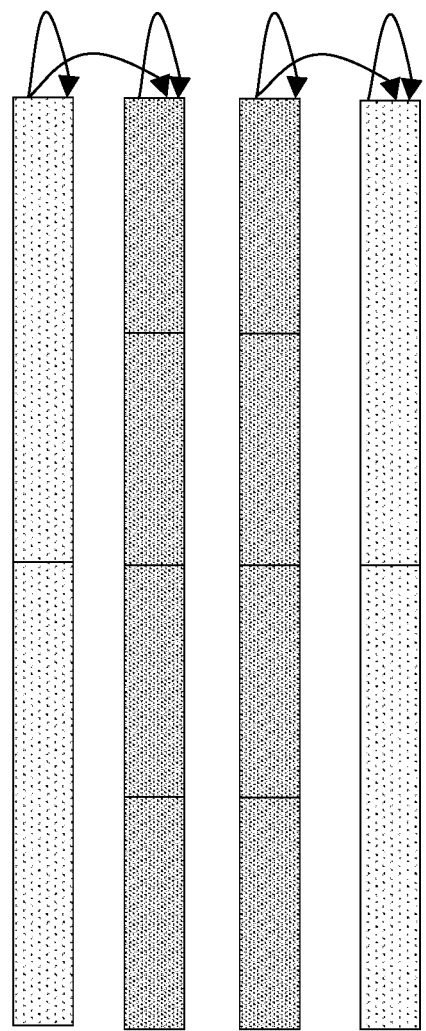
FIG. 6 is a diagram illustrating an example of cross-scheduling and self-scheduling among two cells with different SCS.

FIG. 6 is a diagram 600 illustrating an example of cross-scheduling and self-scheduling among two cells with different SCS. For example, the UE does not report pdcch-BlindDetectionCA or the total number of configured DL cells being less than a reference number of DL cells (e.g., $N_{cells}^{DL} \le N_{cells}^{cap}$). A cell (e.g., cell B) may be scheduled by two scheduling cells (e.g., itself and another cell (cell A)). In an example each of the two scheduling cells have different SCS.

In an aspect, if for cell B the network has allocated x parts of the per cell limit to PDCCH candidates received in the scheduling cell A and y parts of the per cell limit to PDCCH candidates received in the scheduling cell B, and x+y=1 in slots of cell B and corresponding slots of cell A, then the following occurs. The number of BDs $\hat{M}_{PDCCH}^{slot_{A,i}}$ and the number of CCEs $\hat{C}_{PDCCH}^{slot_{A,i}}$ to be processed for PDCCH candidates received in any slot i of cell A should be $\hat{M}_{PDCCH}^{slot_{A,i}} \le x \cdot M_{PDCCH}^{max,slot,\mu_A}$ and $\hat{C}_{PDCCH}^{slot_{A,i}} \le x \cdot C_{PDCCH}^{max,slot,\mu_A}$. Further, the number of BDs $\hat{M}_{PDCCH}^{slot_{B,j}}$ and the number of CCEs $\hat{C}_{PDCCH}^{slot_{B,j}}$ to be processed for PDCCH candidates received in any slot j of cell B should be $\hat{M}_{PDCCH}^{slot_{B,j}} \le y \cdot M_{PDCCH}^{max,slot,\mu_B}$ and $\hat{C}_{PDCCH}^{slot_{B,j}} \le y \cdot C_{PDCCH}^{max,slot,\mu_B}$.

In an aspect, the summation of a normalized number of BDs or CCEs in the slot normalized by the respective single cell limit in each pair of overlapping slots in the two scheduling cells may not be larger than 1. For example, $$\frac{\hat{M}_{PDCCH}^{slot_{A,i}}}{M_{PDCCH}^{max,slot,\mu_A}} + \frac{\hat{M}_{PDCCH}^{slot_{B,j}}}{M_{PDCCH}^{max,slot,\mu_B}} \le 1 \text{ and}$$

$$\frac{\hat{C}_{PDCCH}^{slot_{A,i}}}{C_{PDCCH}^{max,slot,\mu_A}} + \frac{\hat{C}_{PDCCH}^{slot_{B,j}}}{C_{PDCCH}^{max,slot,\mu_B}} \le 1$$

for any slot i of cell A and any slot j of cell B that overlaps with slot i of cell A. In an example, if cell A's SCS is 15 kHz and cell B's SCS is 30 kHz, then j=2i, 2i+1. In another example, if cell A's SCS is 30 kHz and cell B's SCS is 15 kHz, then i=2j, 2j+1.

In an aspect, a scheduling cell (e.g., cell A) may be defined as the reference scheduling cell. The summation of the number of BDs or CCEs for PDCCH candidates for cell B received in a slot of the reference scheduling cell and the scaled number of BDs or CCEs for PDCCH candidates for cell B received in any slot in the other scheduling cell (e.g., cell B) that overlaps with the slot of the reference scheduling cell is not larger than the single cell limit in a slot of the reference scheduling cell. For example, $$\hat{M}_{PDCCH}^{slot_{A,i}} + \hat{M}_{PDCCH}^{slot_{B,j}} \cdot \frac{M_{PDCCH}^{max,slot,\mu_A}}{M_{PDCCH}^{max,slot,\mu_B}} \le M_{PDCCH}^{max,slot,\mu_A} \text{ and}$$

$$\hat{C}_{PDCCH}^{slot_{A,i}} + \hat{C}_{PDCCH}^{slot_{B,j}} \cdot \frac{C_{PDCCH}^{max,slot,\mu_A}}{C_{PDCCH}^{max,slot,\mu_B}} \le C_{PDCCH}^{max,slot,\mu_A}$$

for any slot i of cell A and any slot j of cell B that overlaps with slot i of cell A.

In an aspect, a scheduling cell (e.g., cell A) may be defined as the reference scheduling cell. The summation of the number of BDs or CCEs for PDCCH candidates for cell B received in a slot of the reference scheduling cell and the maximum scaled number of BDs or CCEs for PDCCH candidates for cell B received in all slots in the other scheduling cell (e.g., cell B) that overlap with the slot of the reference scheduling cell may not be larger than the single cell limit in a slot of the reference scheduling cell. For example, $$\hat{M}_{PDCCH}^{slot_{A,i}} + \max(\hat{M}_{PDCCH}^{slot_{B,j}}) \cdot \frac{M_{PDCCH}^{max,slot,\mu_A}}{M_{PDCCH}^{max,slot,\mu_B}} \le M_{PDCCH}^{max,slot,\mu_A} \text{ and}$$

$$\hat{C}_{PDCCH}^{slot_{A,i}} + \max(\hat{C}_{PDCCH}^{slot_{B,j}}) \cdot \frac{C_{PDCCH}^{max,slot,\mu_A}}{C_{PDCCH}^{max,slot,\mu_B}} \le C_{PDCCH}^{max,slot,\mu_A}$$

where max(·) is taken over all slots of the other scheduling cell (e.g., cell B) that overlap with slot i of the reference scheduling cell. In some instances, the left side of the above inequalities may be used as a generalized number of BDs and CCEs to define the per cell limit and total limit for a set of cells.

In an aspect, the UE may report the PDCCH blind detection capability for CA (i.e., pdcch-BlindDetectionCA) and the total number of configured DL cells is larger than the reference number of DL cells (e.g., $N_{cells}^{DL} > N_{cells}^{cap}$). For example, among all configured DL cells, two cells configured to the UE have cross-carrier scheduling relationship and the two cells may have different SCS.

In an aspect, when a cell is scheduled by multiple cells, a reference scheduling cell is defined for the scheduled cell from all the scheduling cells. For example, the scheduled cell is determined as a cell having the same SCS as the reference scheduling cell in the set of cells having this SCS. Subsequently the PDCCH BD/CCE limit may be determined based on the SCS of the reference scheduling cell.

FIG. 7 is a diagram 700 illustrating another example of cross-scheduling and self-scheduling among two cells within the configured DL cells and the two cells have different SCS. For example, cell A is the reference scheduling cell and cell B may be counted as a cell into the set of cells for the SCS of cell A when the number of configured DL cells for the SCS of cell A (i.e., $N_{cells}^{DL,\mu_A}$) is determined in the same way as the second step of the normal CA case. The determined number of configured DL cells for the SCS of cell A is further used in the second step to determine the reference number of DL cells (i.e., $N_{cells}^{cap,\mu_A}$) for the set of cells for the SCS of cell A by $N_{cells}^{cap,\mu_A} = N_{cells}^{cap} \cdot N_{cells}^{DL,\mu_A}/N_{cells}^{DL}$. Further, the number of BDs/CCEs in a slot i of the reference scheduling cell for PDCCH candidates for cell B that are received in all cells that schedule cell B is replaced by $$\hat{M}_{PDCCH}^{slot_A,i} + \max(\hat{M}_{PDCCH}^{slot_B,j}) \cdot \frac{M_{PDCCH}^{max,slot,\mu_A}}{M_{PDCCH}^{max,slot,\mu_B}}$$

$$\hat{C}_{PDCCH}^{slot_A,i} + \max(\hat{C}_{PDCCH}^{slot_B,j}) \cdot \frac{C_{PDCCH}^{max,slot,\mu_A}}{C_{PDCCH}^{max,slot,\mu_B}}$$

where max(·) is taken over all slots of a scheduling cell that overlap with slot i of the reference scheduling cell. The total PDCCH limit for the set of cells for the SCS of the reference scheduling cell (i.e., cell A) in a slot of the reference scheduling cell is determined in the same way as the third step of a normal CA case by $M_{PDCCH}^{total,slot,\mu_A} = \lfloor N_{cells}^{cap,\mu_A} \cdot M_{PDCCH}^{max,slot,\mu_A} \rfloor$ and $C_{PDCCH}^{total,slot,\mu_A} = \lfloor N_{cells}^{cap,\mu_A} \cdot C_{PDCCH}^{max,slot,\mu_A} \rfloor$. The per cell limit of BD/CCE number in a slot of the reference scheduling cell for all PDCCH candidates for cell B that are received in all cells that schedule cell B is defined in the same way as the fourth step of a normal CA case by $$\min(M_{PDCCH}^{total,slot,\mu_A}, M_{PDCCH}^{max,slot,\mu_A}),$$

$$\min(C_{PDCCH}^{total,slot,\mu_A}, C_{PDCCH}^{max,slot,\mu_A})$$

FIG. 8 is a diagram 800 illustrating an example of multiple cross-scheduling and self-scheduling among multiple cells with different SCS. For example, multiple cells (e.g., greater than 2 cells) may schedule a cell. In this example, a reference scheduling cell is chosen and the SCS $\mu_r$ is used to determine BD/CCE limit. Subsequently, a cell that is scheduled by another cell that has the same SCS as the reference scheduling cell is counted into the set of cells associated with $\mu_r$. The number of configured DL cells for the SCS of the reference scheduling cell (i.e., $N_{cells}^{DL,\mu_r}$) is determined in the same way as the second step of the normal CA case. The determined number of configured DL cells for the SCS of the reference scheduling cell is further used in the second step to determine the reference number of DL cells (i.e., $N_{cells}^{DL,\mu_r}$) for the set of cells for the SCS of the reference scheduling cell by $N_{cells}^{cap,\mu_r} = N_{cells}^{cap} \cdot N_{cells}^{DL,\mu_r}/N_{cells}^{DL}$. The reference scheduling cell may be a scheduling cell among scheduling cells of the cell with the smallest SCS or a scheduling cell with the smallest SCS of all scheduling cells except for this cell if the cell is self-scheduled by itself. Further the number of BDs/CCEs in a slot i of the reference scheduling cell for PDCCH candidates for the cell that are received in all cells that schedule the cell is replaced by $$\hat{M}_{PDCCH}^{slot_i,\mu_r} + \sum_c \max(\hat{M}_{PDCCH}^{slot_j,\mu_c}) \cdot \frac{M_{PDCCH}^{max,slot,\mu_r}}{M_{PDCCH}^{max,slot,\mu_c}}$$

$$\hat{C}_{PDCCH}^{slot_i,\mu_r} + \sum_c \max(\hat{C}_{PDCCH}^{slot_j,\mu_c}) \cdot \frac{C_{PDCCH}^{max,slot,\mu_r}}{C_{PDCCH}^{max,slot,\mu_c}}$$

where max(·) is taken over all slots of a scheduling cell that overlap with slot i of the reference scheduling cell for the cell, c is index of scheduling cells for the scheduled cell except for the reference scheduling cell. The per cell BD/CCE limit for the cell and the total limit for the set of cells with $\mu_r$ is defined within a slot of the scheduling cell in the same way as existing CA case. The total PDCCH limit for the set of cells for the SCS of the reference scheduling cell in a slot of the reference scheduling cell is determined in the same way as the third step of a normal CA case by $M_{PDCCH}^{total,slot,\mu_r} = \lfloor N_{cells}^{cap,\mu_r} \cdot M_{PDCCH}^{max,slot,\mu_r} \rfloor$ and $C_{PDCCH}^{total,slot,\mu_r} = \lfloor N_{cells}^{cap,\mu_r} \cdot C_{PDCCH}^{max,slot,\mu_r} \rfloor$. The per cell limit of BD/CCE number in a slot of the reference scheduling cell for all PDCCH candidates for the cell that are received in all cells that schedule the cell is defined in the same way as the fourth step of a normal CA case by $\min(M_{PDCCH}^{total,slot,\mu_r}, M_{PDCCH}^{max,slot,\mu_r})$ and $\min(C_{PDCCH}^{total,slot,\mu_r}, C_{PDCCH}^{max,slot,\mu_r})$.

FIG. 9 illustrate a flow chart of an example of a method 900 for wireless communication at a UE, and more specifically, PDCCH limits for multiple cells scheduling one cell based on a reference scheduling cell. In an example, a UE 104 can perform the functions described in method 900 using one or more of the components described in FIGS. 1, 2, 3, and 11.

At block 902, the method 900 may determine a PDCCH limit, the PDCCH limit corresponding to at least one of a number of BDs and a number of CCEs used for decoding PDCCH candidates for a first cell that schedules a second cell, and for at least a third cell that schedules the second cell, wherein the third cell is the same cell as the second cell or the third cell is different from the second cell. In an aspect, the communicating component 342, e.g., in conjunction with processor(s) 312, memory 316, and/or transceiver 302, may be configured to determine a PDCCH limit, the PDCCH limit corresponding to at least one of a number of BDs and a number of CCEs used for decoding PDCCH candidates for a first cell that schedules a second cell, and for at least a third cell that schedules the second cell, wherein the third cell is the same cell as the second cell or the third cell is different from the second cell. In one example, the data can be associated with a priority level. Thus, the UE 104, the processor(s) 312, the communicating component 342 or one of its subcomponents may define the means for determining a PDCCH limit, the PDCCH limit corresponding to at least one of a number of BDs and a number of CCEs used for decoding PDCCH candidates for a first cell that schedules a second cell, and for at least a third cell that schedules the second cell, wherein the third cell is the same cell as the second cell or the third cell is different from the second cell. For example, in an aspect, the UE 104 and/or the communication component 342 may process a signal, such as PDCCH candidates configured by network 102 by search space set configurations, and determine the PDCCH limit, and/or perform other signal processes such as described above in FIG. 3, and thereby determine the maximum number of BDs and CCEs a UE 104 is expected to process in a slot for decoding the PDCCH candidates.

At block 904, the method 900 may receive one or more PDCCH transmissions from the first cell and the third cell based on the PDCCH limit. In an aspect, the communicating component 342, e.g., in conjunction with processor(s) 312, memory 316, and/or transceiver 302, may be configured to receive one or more PDCCH transmissions from the first cell and the third cell based on the PDCCH limit. Thus, the UE 104, the processor(s) 312, the communicating component 342 or one of its subcomponents may define the means for receiving one or more PDCCH transmissions from the first cell and the third cell based on the PDCCH limit. For example, in an aspect, the UE 104 and/or the communication component 342 may receive a wireless signal, transmitted by the network entity 102, at one or more antennae or antenna arrays, demodulate and decode the signal, and/or perform other signal receiving processes such as described above in FIG. 3, and thereby obtain the one or more PDCCH transmissions.

In some aspects, method 900 may include at least one of foregoing reporting of a PDCCH BD CA capability message or a total number of configured downlink cells being less than a reference number of downlink cells.

In some aspects, the third cell is the same cell as the second cell, the second cell is self-scheduled by itself and cross-carrier scheduled by the first cell.

In some aspects, a SCS of the first cell is identical to a SCS of the second cell.

In some aspects, the PDCCH limit corresponds to a maximum number of BDs and a maximum number of CCEs a UE is expected to process in a slot for decoding the PDCCH candidates for the second cell that are received in the first cell and the PDCCH candidates for the second cell in the slot that are received in the second cell, wherein the PDCCH limit is equal to a single cell PDCCH BD limit and CCE limit associated with the SCS.

In some aspects, the third cell is the same cell as the second cell and a subcarrier spacing (SCS) of the first cell differs from a SCS of the second cell.

In some aspects, at least one of foregoing reporting of a PDCCH BD CA capability message or a total number of configured downlink cells being less than a reference number of downlink cells.

In some aspects, the third cell is self-scheduled by itself and cross-carrier scheduled by the first cell.

In some aspects, a first subset of parts of the PDCCH limit to the PDCCH candidates for the second cell received in the first cell and a second subset of parts of the PDCCH limit to the PDCCH candidates for the second cell received in the second cell are allocated in one or more slots of the second cell and one or more corresponds of the first cell.

In some aspects, a sum of the first subset of parts and the second subset of parts equals one in the one or more slots of the second cell and the one or more corresponds of the first cell.

In some aspects, a sum of a normalized number of BDs or CCEs in a slot normalized by a respective single cell limit in each pair of overlapping slots in both the first cell and the second cell is not larger than a threshold.

In some aspects, one of the first cell or the second cell corresponds to a reference scheduling cell.

In some aspects, a sum of the number of BDs or CCEs in a slot of the reference scheduling cell and a scaled number of BDs or CCEs in any slot of the other cell other than the reference scheduling cell that overlaps with the slot of the reference scheduling cell is not larger than a threshold.

In some aspects, the scaled number is based on the ratio between the single cell PDCCH limit of the reference scheduling cell and the single cell PDCCH limit of the other cell.

In some aspects, the threshold corresponds to the single cell PDCCH BD and CCE limit of the reference scheduling cell associated with the SCS of the reference scheduling cell.

In some aspects, a sum of the number of BDs or CCEs in a slot of the reference scheduling cell and a maximum scaled number of BDs or CCEs in all slots of the other cell other than the reference scheduling cell that overlap with the slot of the first cell is not larger than a threshold.

In some aspects, the scaled number is based on the ratio between the single cell PDCCH limit of the reference scheduling cell and the single cell PDCCH limit of the other cell.

In some aspects, the threshold corresponds to the single cell PDCCH BD and CCE limit of the reference scheduling cell associated with the SCS of the reference scheduling cell.

In some aspects, the third cell being the same cell as the second cell and reporting of a PDCCH BD CA capability message and a total number of configured downlink cells being larger than a reference number of downlink cells, wherein the second cell is self-scheduled by itself and cross-carrier scheduled by the first cell.

In some aspects, a SCS of the first cell differs from a SCS of the second cell.

In some aspects, one of the first cell or the second cell corresponds to a reference scheduling cell.

In some aspects, a SCS of the other cell other than the reference scheduling cell is equivalent to a SCS of the reference scheduling cell, and wherein determining the PDCCH limit includes determining the PDCCH limit based on the SCS of the other cell or the reference scheduling cell.

In some aspects, the first cell corresponds to a reference scheduling cell.

In some aspects, the second cell is identified as a cell into a set of cells for a SCS of the first cell.

In some aspects, the number of BDs and the number of CCEs in a slot of the first cell is a sum of the number of BDs and the number of CCEs for PDCCH candidates received in the first cell in the slot and a maximum number of BDs and CCEs for PDCCH candidates received in the second cell over all slots of the second cell that overlap with the slot of the first cell.

In some aspects, the PDCCH limit of the number of BDs and the number of CCEs in a slot of the second cell is identified based on a minimum of single cell limit for the first cell and a total PDCCH BD and CCE limit in a slot for a set of cells for the SCS of the first cell, wherein the total PDCCH BD and CCE limit in a slot for the set of cells for the SCS of the first cell is determined by a single cell limit for the first cell scaled by the reference number of cells for the SCS.

In some aspects, method 900 may include scheduling the second cell by the first cell and the third cell, wherein the third cell is not a same cell as the second cell; selecting a reference scheduling cell from at least one of the first cell, the second cell or the third cell; and wherein determining the PDCCH limit includes determining the PDCCH limit based on a SCS of the reference scheduling cell.

In some aspects, the reference scheduling cell corresponds to a scheduling cell of a set of scheduling cells having a smallest SCS or a scheduling cell with a smallest SCS of all scheduling cells excluding the second cell.

In some aspects, the number of BDs and the number of CCEs in a slot of the reference scheduling cell for PDCCH candidates for the second cell is a sum of the maximum number of BDs and CCEs over all slots of a cell that schedules the second cell that overlap with the slot of the reference scheduling cell scaled by a ratio between the single cell PDCCH limit of the reference scheduling cell and the single cell PDCCH limit of the cell that schedules the second cell for all cells that schedule the second cell.

In some aspects, the PDCCH limit for the second cell and a total limit for a set of cells is identified within a slot of the reference scheduling cell.

Figure 10:
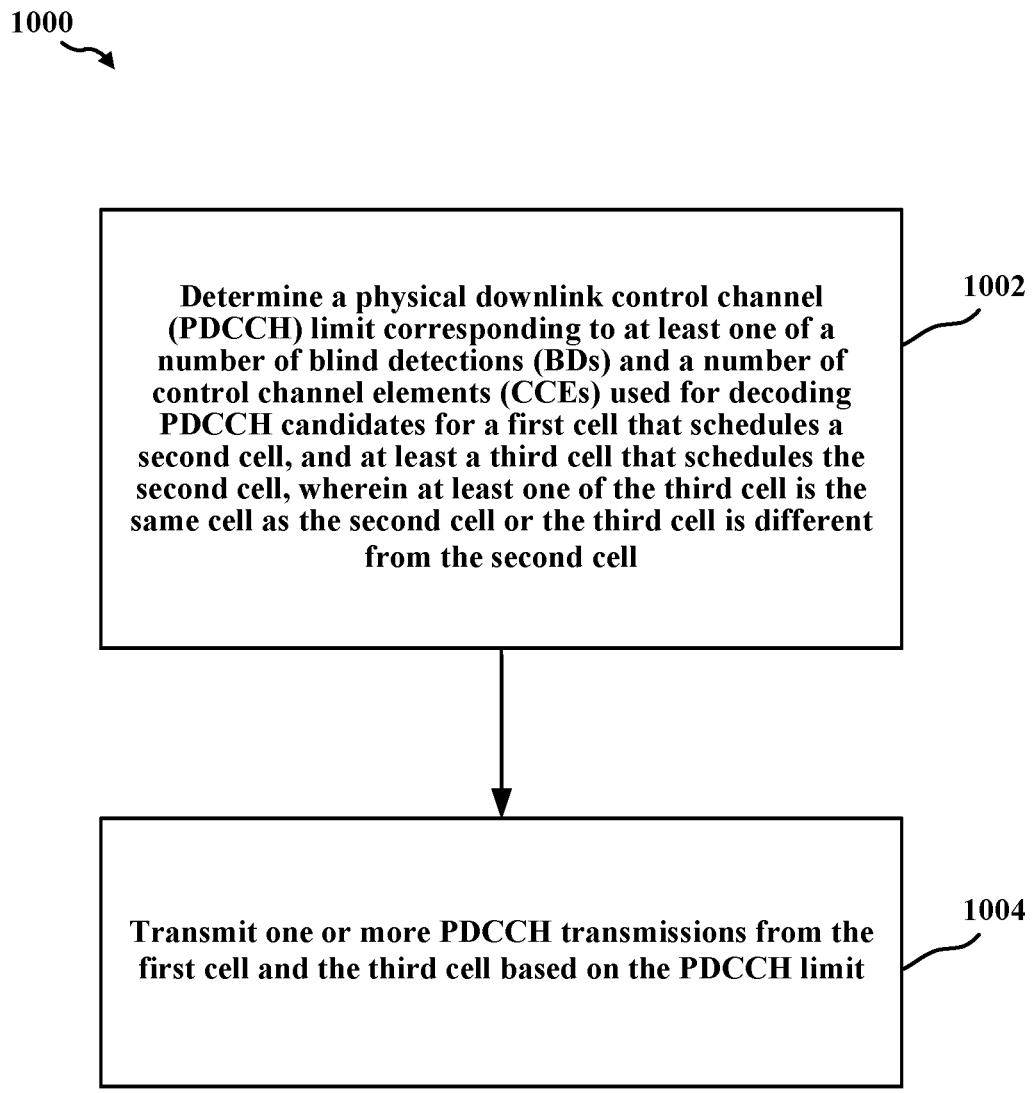
FIG. 10 is a flowchart of another method of wireless communication, and more specifically PDCCH limits for multiple cells scheduling one cell based on a reference scheduling cell.

FIG. 10 illustrate a flow chart of an example of a method 1000 for wireless communication at a node, which may be an IAB node, and more specifically, PDCCH limits for multiple cells scheduling one cell based on a reference scheduling cell. In an example, a base station 102 can perform the functions described in method 1000 using one or more of the components described in FIGS. 1, 2, 3, and 11.

At block 1002, the method 1000 may determine a PDCCH limit, the PDCCH limit corresponding to at least one of a number of BDs and a number of CCEs used for decoding PDCCH candidates for a first cell that schedules a second cell, and for at least a third cell that schedules the second cell, wherein the third cell is the same cell as the second cell or the third cell is different from the second cell. In an aspect, the communicating component 242, e.g., in conjunction with processor(s) 212, memory 216, and/or transceiver 202, may be configured to determine a PDCCH limit, the PDCCH limit corresponding to at least one of a number of BDs and a number of CCEs used for decoding PDCCH candidates for a first cell that schedules a second cell, and for at least a third cell that schedules the second cell, wherein the third cell is the same cell as the second cell or the third cell is different from the second cell. In one example, the data can be associated with a priority level. Thus, the base station 102, the processor(s) 212, the communicating component 242 or one of its subcomponents may define the means for determining a PDCCH limit, the PDCCH limit corresponding to at least one of a number of BDs and a number of CCEs used for decoding PDCCH candidates for a first cell that schedules a second cell, and for at least a third cell that schedules the second cell, wherein the third cell is the same cell as the second cell or the third cell is different from the second cell. For example, in an aspect, the base station 102 and/or the communication component 242 may process a signal, such as PDCCH candidates, and determine the PDCCH limit, and/or perform other signal processes such as described above in FIG. 3, and thereby determine the maximum number of BDs and CCEs a base station 102 is expected to process in a slot for decoding the PDCCH candidates.

At block 1004, the method 1000 may transmit one or more PDCCH transmissions from the first cell and the third cell based on the PDCCH limit. In an aspect, the communicating component 242, e.g., in conjunction with processor(s) 212, memory 216, and/or transceiver 202, may be configured to transmit one or more PDCCH transmissions from the first cell and the third cell based on the PDCCH limit. Thus, the base station 102, the processor(s) 212, the communicating component 242 or one of its subcomponents may define the means for transmitting one or more PDCCH transmissions from the first cell and the third cell based on the PDCCH limit. For example, in an aspect, the base station 102 and/or the communication component 242 may receive a wireless signal, transmitted by the UE 104, at one or more antennae or antenna arrays, demodulate and decode the signal, and/or perform other signal receiving processes such as described above in FIG. 3, and thereby obtain the one or more PDCCH transmissions.

In some aspects, method 1000 may include at least one of receiving reporting of a PDCCH BD CA capability message or a total number of configured downlink cells being less than a reference number of downlink cells.

In some aspects, the third cell is the same cell as the second cell, the second cell is self-scheduled by itself and cross-carrier scheduled by the first cell.

In some aspects, a SCS of the first cell is identical to a SCS of the second cell.

In some aspects, the PDCCH limit corresponds to a maximum number of BDs and a maximum number of CCEs a UE is expected to process in a slot for decoding the PDCCH candidates for the second cell that are received in the first cell and the PDCCH candidates for the second cell in the slot that are received in the second cell, wherein the PDCCH limit is equal to a single cell PDCCH BD limit and CCE limit associated with the SCS.

In some aspects, the third cell is the same cell as the second cell and a SCS of the first cell differs from a SCS of the second cell.

In some aspects, at least one of receiving reporting of a PDCCH BD CA capability message or a total number of configured downlink cells being less than a reference number of downlink cells.

In some aspects, the third cell is self-scheduled by itself and cross-carrier scheduled by the first cell.

In some aspects, a first subset of parts of the PDCCH limit to the PDCCH candidates for the second cell received in the first cell and a second subset of parts of the PDCCH limit to the PDCCH candidates for the second cell received in the second cell are allocated in one or more slots of the second cell and one or more corresponds of the first cell.

In some aspects, a sum of the first subset of parts and the second subset of parts equals one in the one or more slots of the second cell and the one or more corresponds of the first cell.

In some aspects, a sum of a normalized number of BDs or CCEs in a slot normalized by a respective single cell limit in each pair of overlapping slots in both the first cell and the second cell is not larger than a threshold.

In some aspects, one of the first cell or the second cell corresponds to a reference scheduling cell.

In some aspects, a sum of the number of BDs or CCEs in a slot of the reference scheduling cell and a scaled number of BDs or CCEs in any slot of the other cell other than the reference scheduling cell that overlaps with the slot of the reference scheduling cell is not larger than a threshold.

In some aspects, the scaled number is based on the ratio between the single cell PDCCH limit of the reference scheduling cell and the single cell PDCCH limit of the other cell.

In some aspects, the threshold corresponds to the single cell PDCCH BD and CCE limit of the reference scheduling cell associated with the SCS of the reference scheduling cell.

In some aspects, a sum of the number of BDs or CCEs in a slot of the reference scheduling cell and a maximum scaled number of BDs or CCEs in all slots of the other cell other than the reference scheduling cell that overlap with the slot of the first cell is not larger than a threshold.

In some aspects, the scaled number is based on the ratio between the single cell PDCCH limit of the reference scheduling cell and the single cell PDCCH limit of the other cell.

In some aspects, the threshold corresponds to the single cell PDCCH BD and CCE limit of the reference scheduling cell associated with the SCS of the reference scheduling cell.

In some aspects, the third cell being the same cell as the second cell and reporting of a PDCCH BD CA capability message and a total number of configured downlink cells being larger than a reference number of downlink cells, wherein the second cell is self-scheduled by itself and cross-carrier scheduled by the first cell.

In some aspects, a SCS of the first cell differs from a SCS of the second cell.

In some aspects, one of the first cell or the second cell corresponds to a reference scheduling cell.

In some aspects, a SCS of the other cell other than the reference scheduling cell is equivalent to a SCS of the reference scheduling cell, and wherein determining the PDCCH limit includes determining the PDCCH limit based on the SCS of the other cell or the reference scheduling cell.

In some aspects, the first cell corresponds to a reference scheduling cell.

In some aspects, the second cell is identified as a cell into a set of cells for a SCS of the first cell.

In some aspects, the number of BDs and the number of CCEs in a slot of the first cell is a sum of the number of BDs and the number of CCEs for PDCCH candidates received in the first cell in the slot and a maximum number of BDs and CCEs for PDCCH candidates received in the second cell over all slots of the second cell that overlap with the slot of the first cell.

In some aspects, the PDCCH limit of the number of BDs and the number of CCEs in a slot of the second cell is identified based on a minimum of single cell limit for the first cell and a total PDCCH BD and CCE limit in a slot for a set of cells for the SCS of the first cell, wherein the total PDCCH BD and CCE limit in a slot for the set of cells for the SCS of the first cell is determined by a single cell limit for the first cell scaled by the reference number of cells for the SCS.

In some aspects, method 900 may include scheduling the second cell by the first cell and the third cell, wherein the third cell is not a same cell as the second cell; selecting a reference scheduling cell from at least one of the first cell, the second cell or the third cell; and wherein determining the PDCCH limit includes determining the PDCCH limit based on a SCS of the reference scheduling cell.

In some aspects, the reference scheduling cell corresponds to a scheduling cell of a set of scheduling cells having a smallest SCS or a scheduling cell with a smallest SCS of all scheduling cells excluding the second cell.

In some aspects, the number of BDs and the number of CCEs in a slot of the reference scheduling cell for PDCCH candidates for the second cell is a sum of the maximum number of BDs and CCEs over all slots of a cell that schedules the second cell that overlap with the slot of the reference scheduling cell scaled by a ratio between the single cell PDCCH limit of the reference scheduling cell and the single cell PDCCH limit of the cell that schedules the second cell for all cells that schedule the second cell.

In some aspects, the PDCCH limit for the second cell and a total limit for a set of cells is identified within a slot of the reference scheduling cell.

Figure 11:
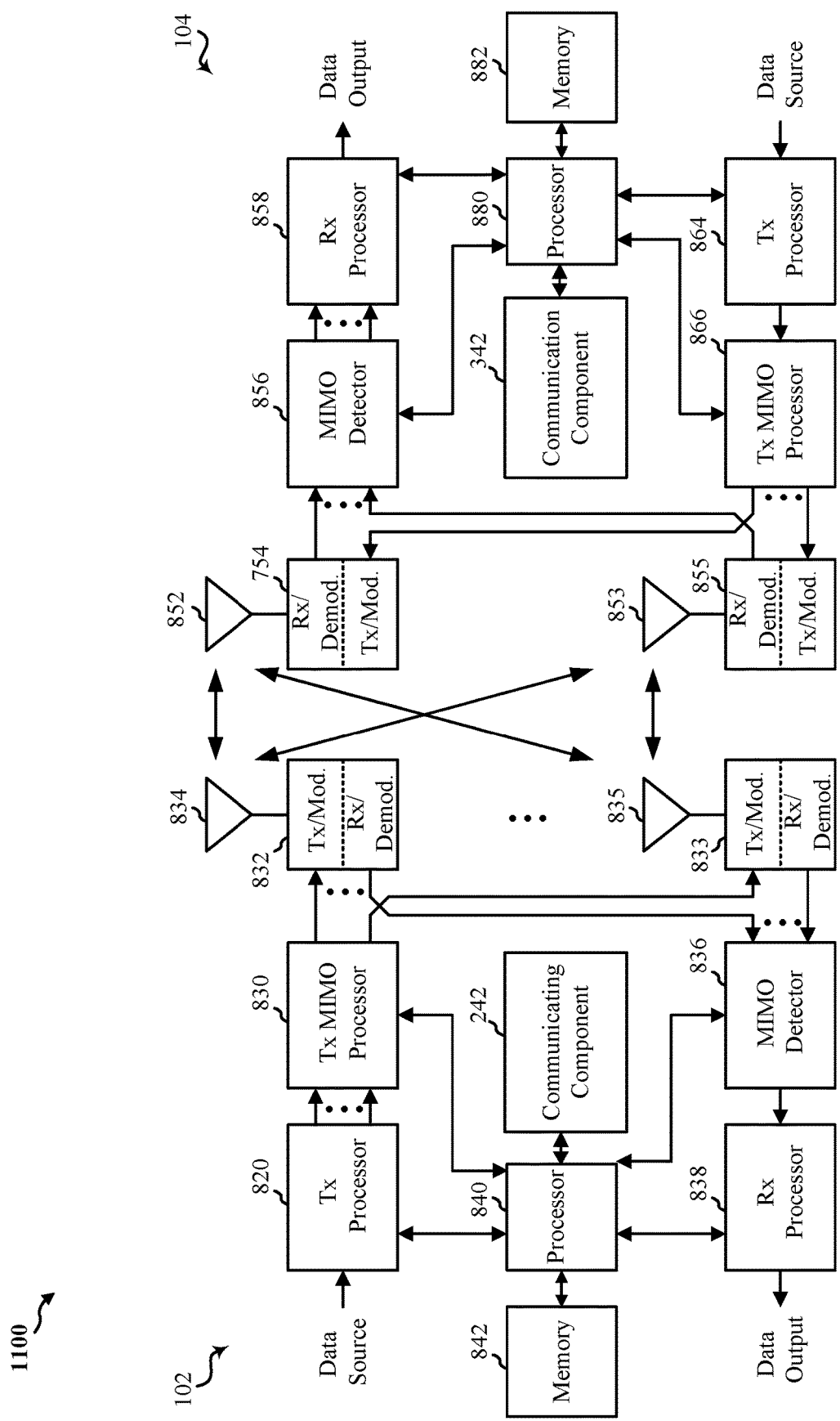
FIG. 11 is a block diagram illustrating an example of a MIMO communication system including a base station and a UE, in accordance with various aspects of the present disclosure.

FIG. 11 is a block diagram of a MIMO communication system 1100 including a base station 102, which may be acting as an IAB node or a parent node, and a UE 104. The MIMO communication system 1100 may illustrate aspects of the wireless communication access network 100 described with reference to FIG. 1. The base station 102 may be an example of aspects of the base station 102 described with reference to FIG. 1. The base station 102 may be equipped with antennas 1134 and 1135, and the UE 104 may be equipped with antennas 1152 and 1153. In the MIMO communication system 1100, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1120 may receive data from a data source. The transmit processor 1120 may process the data. The transmit processor 1120 may also generate control symbols or reference symbols. A transmit MIMO processor 1130 may perform spatial processing (e.g., precoding) on data symbols, control symbols, or reference symbols, if applicable, and may provide output symbol streams to the transmit modulator/demodulators 1132 and 1133. Each modulator/demodulator 1132 through 1133 may process a respective output symbol stream (e.g., for OFDM, etc.) to obtain an output sample stream. Each modulator/demodulator 1132 through 1133 may further process (e.g., convert to analog, amplify, filter, and upconvert) the output sample stream to obtain a DL signal. In one example, DL signals from modulator/demodulators 1132 and 1133 may be transmitted via the antennas 1134 and 1135, respectively.

The UE 104 may be an example of aspects of the UEs 104 described with reference to FIGS. 1 and 2. At the UE 104, the UE antennas 1152 and 1153 may receive the DL signals from the base station 102 and may provide the received signals to the modulator/demodulators 1154 and 1155, respectively. Each modulator/demodulator 1154 through 1155 may condition (e.g., filter, amplify, downconvert, and digitize) a respective received signal to obtain input samples. Each modulator/demodulator 1154 through 1155 may further process the input samples (e.g., for OFDM, etc.) to obtain received symbols. A MIMO detector 1156 may obtain received symbols from the modulator/demodulators 1154 and 1155, perform MIMO detection on the received symbols, if applicable, and provide detected symbols. A receive (Rx) processor 1158 may process (e.g., demodulate, deinterleave, and decode) the detected symbols, providing decoded data for the UE 104 to a data output, and provide decoded control information to a processor 1180, or memory 1182.

The processor 1180 may in some cases execute stored instructions to instantiate a communicating component 242 (see e.g., FIGS. 1 and 2).

On the uplink (UL), at the UE 104, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the modulator/demodulators 1154 and 1155 (e.g., for SC-FDMA, etc.), and be transmitted to the base station 102 in accordance with the communication parameters received from the base station 102. At the base station 102, the UL signals from the UE 114 may be received by the antennas 1134 and 1135, processed by the modulator/demodulators 1132 and 1133, detected by a MIMO detector 1136 if applicable, and further processed by a receive processor 1138. The receive processor 1138 may provide decoded data to a data output and to the processor 1140 or memory 1142.

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1100.

Some Further Example Clauses

Implementation examples are described in the following numbered clauses:

1. An apparatus for wireless communication at a user equipment (UE), comprising:
   a transceiver;
   a memory configured to store instructions; and
   one or more processors communicatively coupled with the transceiver and the memory, wherein the one or more processors are configured to:
   determine a physical downlink control channel (PDCCH) limit, the PDCCH limit corresponding to at least one of a number of blind detections (BDs) and a number of control channel elements (CCEs) used for decoding PDCCH candidates for a first cell that schedules a second cell, and for at least a third cell that schedules the second cell; and
   receive one or more PDCCH transmissions from the first cell and the third cell based on the PDCCH limit.
2. The apparatus of any preceding clause, wherein the one or more processors are configured to at least one of forego reporting of a PDCCH BD carrier aggregation (CA) capability message or a total number of configured downlink cells being less than a reference number of downlink cells.
3. The apparatus of any preceding clause, wherein the third cell is the same cell as the second cell, the second cell is self-scheduled by itself and cross-carrier scheduled by the first cell.
4. The apparatus of any preceding clause, wherein a subcarrier spacing (SCS) of the first cell is identical to a SCS of the second cell.
5. The apparatus of any preceding clause, wherein the PDCCH limit corresponds to a maximum number of BDs and a maximum number of CCEs a user equipment (UE) is expected to process in a slot for decoding the PDCCH candidates for the second cell that are received in the first cell and the PDCCH candidates for the second cell in the slot that are received in the second cell, wherein the PDCCH limit is equal to a single cell PDCCH BD limit and CCE limit associated with the SCS.
6. The apparatus of any preceding clause, wherein the third cell is the same cell as the second cell and a subcarrier spacing (SCS) of the first cell differs from a SCS of the second cell.
7. The apparatus of any preceding clause, wherein the one or more processors are configured to at least one of forego reporting of a PDCCH BD carrier aggregation (CA) capability message or a total number of configured downlink cells being less than a reference number of downlink cells.
8. The apparatus of any preceding clause, wherein the second cell is self-scheduled by itself and cross-carrier scheduled by the first cell.
9. The apparatus of any preceding clause, wherein a first subset of parts of the PDCCH limit to the PDCCH candidates for the second cell received in the first cell and a second subset of parts of the PDCCH limit to the PDCCH candidates for the second cell received in the second cell are allocated in one or more slots of the second cell and one or more corresponds of the first cell.
10. The apparatus of any preceding clause, wherein a sum of the first subset of parts and the second subset of parts equals one in the one or more slots of the second cell and the one or more corresponds of the first cell.
11. The apparatus of any preceding clause, wherein a sum of a normalized number of BDs or CCEs in a slot normalized by a respective single cell limit in each pair of overlapping slots in both the first cell and the second cell is not larger than a threshold.
12. The apparatus of any preceding clause, wherein one of the first cell or the second cell corresponds to a reference scheduling cell.
13. The apparatus of any preceding clause, wherein a sum of the number of BDs or CCEs in a slot of the reference scheduling cell and a scaled number of BDs or CCEs in any slot of the other cell other than the reference scheduling cell that overlaps with the slot of the reference scheduling cell is not larger than a threshold.
14. The apparatus of any preceding clause, wherein the scaled number is based on the ratio between the single cell PDCCH limit of the reference scheduling cell and the single cell PDCCH limit of the other cell.
15. The apparatus of any preceding clause, wherein the threshold corresponds to the single cell PDCCH BD and CCE limit of the reference scheduling cell associated with the SCS of the reference scheduling cell.
16. The apparatus of any preceding clause, wherein a sum of the number of BDs or CCEs in a slot of the reference scheduling cell and a maximum scaled number of BDs or CCEs in all slots of the other cell other than the reference scheduling cell that overlap with the slot of the first cell is not larger than a threshold.
17. The apparatus of any preceding clause, wherein the scaled number is based on the ratio between the single cell PDCCH limit of the reference scheduling cell and the single cell PDCCH limit of the other cell.
18. The apparatus of any preceding clause, wherein the threshold corresponds to the single cell PDCCH BD and CCE limit of the reference scheduling cell associated with the SCS of the reference scheduling cell.
19. The apparatus of any preceding clause, wherein a SCS of the other cell other than the reference scheduling cell is equivalent to a SCS of the reference scheduling cell, and wherein determining the PDCCH limit includes determining the PDCCH limit based on the SCS of the other cell or the reference scheduling cell.
20. The apparatus of any preceding clause, further comprising the third cell being the same cell as the second cell and reporting of a PDCCH BD carrier aggregation (CA) capability message and a total number of configured downlink cells being larger than a reference number of downlink cells, wherein the second cell is self-scheduled by itself and cross-carrier scheduled by the first cell.
21. The apparatus of any preceding clause, wherein a subcarrier spacing (SCS) of the first cell differs from a SCS of the second cell.
22. The apparatus of any preceding clause, wherein the third cell is the same cell as the second cell or the third cell is different from the second cell.
23. The apparatus of any preceding clause, wherein the first cell corresponds to a reference scheduling cell.
24. The apparatus of any preceding clause, wherein the second cell is identified as a cell into a set of cells for a subcarrier spacing (SCS) of the first cell.
25. The apparatus of any preceding clause, wherein the number of BDs and the number of CCEs in a slot of the first cell is a sum of the number of BDs and the number of CCEs for PDCCH candidates received in the first cell in the slot and a maximum number of BDs and CCEs for PDCCH candidates received in the second cell over all slots of the second cell that overlap with the slot of the first cell.
26. The apparatus of any preceding clause, wherein the PDCCH limit of the number of BDs and the number of CCEs in a slot of the first cell is identified based on a minimum of single cell limit for the first cell and a total PDCCH BD and CCE limit in a slot for a set of cells for the subcarrier spacing (SCS) of the first cell, wherein the total PDCCH BD and CCE limit in a slot for the set of cells for the SCS of the first cell is determined by a single cell limit for the first cell scaled by the reference number of cells for the SCS.
27. The apparatus of any preceding clause, wherein the one or more processors are configured to:
schedule the second cell by the first cell and the third cell, wherein the third cell is not a same cell as the second cell;
select a reference scheduling cell from at least one of the first cell, the second cell or the third cell; and
wherein the one or more processors are configured to determine the PDCCH limit includes determine the PDCCH limit based on a subcarrier spacing (SCS) of the reference scheduling cell.
28. The apparatus of any preceding clause, wherein the reference scheduling cell corresponds to a scheduling cell of a set of scheduling cells having a smallest SCS or a scheduling cell with a smallest SCS of all scheduling cells excluding the second cell.
29. The apparatus of any preceding clause, wherein the number of BDs and the number of CCEs in a slot of the reference scheduling cell for PDCCH candidates for the second cell is a sum of the maximum number of BDs and CCEs over all slots of a cell that schedules the second cell that overlap with the slot of the reference scheduling cell scaled by a ratio between the single cell PDCCH limit of the reference scheduling cell and the single cell PDCCH limit of the cell that schedules the second cell for all cells that schedule the second cell.
30. The apparatus of any preceding clause, wherein the PDCCH limit for the second cell and a total limit for a set of cells is identified within a slot of the reference scheduling cell.
31. An apparatus for wireless communication at a network entity, comprising:
a transceiver;
a memory configured to store instructions; and
one or more processors communicatively coupled with the transceiver and the memory, wherein the one or more processors are configured to:
determine a physical downlink control channel (PDCCH) limit, the PDCCH limit corresponding to at least one of a number of blind detections (BDs) and a number of control channel elements (CCEs) used for decoding PDCCH candidates for a first cell that schedules a second cell, and for at least a third cell that schedules the second cell; and
transmit one or more PDCCH transmissions from the first cell and the third cell based on the PDCCH limit.
32. The apparatus of any preceding clause, wherein the one or more processors are configured to at least one of receive reporting of a PDCCH BD carrier aggregation (CA) capability message or a total number of configured downlink cells being less than a reference number of downlink cells.
33. The apparatus of any preceding clause, wherein the third cell is the same cell as the second cell, the second cell is self-scheduled by itself and cross-carrier scheduled by the first cell.
34. The apparatus of any preceding clause, wherein a subcarrier spacing (SCS) of the first cell is identical to a SCS of the second cell.
35. The apparatus of any preceding clause, wherein the PDCCH limit corresponds to a maximum number of BDs and a maximum number of CCEs a user equipment (UE) is expected to process in a slot for decoding the PDCCH candidates for the second cell that are received in the first cell and the PDCCH candidates for the second cell in the slot that are received in the second cell, wherein the PDCCH limit is equal to a single cell PDCCH BD limit and CCE limit associated with the SCS.
36. The apparatus of any preceding clause, wherein the third cell is the same cell as the second cell and a subcarrier spacing (SCS) of the first cell differs from a SCS of the second cell.
37. The apparatus of any preceding clause, wherein the one or more processors are configured to at least one of receive reporting of a PDCCH BD carrier aggregation (CA) capability message or a total number of configured downlink cells being less than a reference number of downlink cells.
38. The apparatus of any preceding clause, wherein the second cell is self-scheduled by itself and cross-carrier scheduled by the first cell.
39. The apparatus of any preceding clause, wherein a first subset of parts of the PDCCH limit to the PDCCH candidates for the second cell received in the first cell and a second subset of parts of the PDCCH limit to the PDCCH candidates for the second cell received in the second cell are allocated in one or more slots of the second cell and one or more corresponds of the first cell.
40. The apparatus of any preceding clause, wherein a sum of the first subset of parts and the second subset of parts equals one in the one or more slots of the second cell and the one or more corresponds of the first cell.
41. The apparatus of any preceding clause, wherein a sum of a normalized number of BDs or CCEs in a slot normalized by a respective single cell limit in each pair of overlapping slots in both the first cell and the second cell is not larger than a threshold.
42. The apparatus of any preceding clause, wherein one of the first cell or the second cell corresponds to a reference scheduling cell.
43. The apparatus of any preceding clause, wherein a sum of the number of BDs or CCEs in a slot of the reference scheduling cell and a scaled number of BDs or CCEs in any slot of the other cell other than the reference scheduling cell that overlaps with the slot of the reference scheduling cell is not larger than a threshold.
44. The apparatus of any preceding clause, wherein the scaled number is based on the ratio between the single cell PDCCH limit of the reference scheduling cell and the single cell PDCCH limit of the other cell.
45. The apparatus of any preceding clause, wherein the threshold corresponds to the single cell PDCCH BD and CCE limit of the reference scheduling cell associated with the SCS of the reference scheduling cell.
46. The apparatus of any preceding clause, wherein a sum of the number of BDs or CCEs in a slot of the reference scheduling cell and a maximum scaled number of BDs or CCEs in all slots of the other cell other than the reference scheduling cell that overlap with the slot of the first cell is not larger than a threshold.
47. The apparatus of any preceding clause, wherein the scaled number is based on the ratio between the single cell PDCCH limit of the reference scheduling cell and the single cell PDCCH limit of the other cell.
48. The apparatus of any preceding clause, wherein the threshold corresponds to the single cell PDCCH BD and CCE limit of the reference scheduling cell associated with the SCS of the reference scheduling cell.
49. The apparatus of any preceding clause, wherein a SCS of the other cell other than the reference scheduling cell is equivalent to a SCS of the reference scheduling cell, and wherein determining the PDCCH limit includes determining the PDCCH limit based on the SCS of the other cell or the reference scheduling cell.
50. The apparatus of any preceding clause, further comprising the third cell being the same cell as the second cell and reporting of a PDCCH BD carrier aggregation (CA) capability message and a total number of configured downlink cells being larger than a reference number of downlink cells, wherein the second cell is self-scheduled by itself and cross-carrier scheduled by the first cell.
51. The apparatus of any preceding clause, wherein a subcarrier spacing (SCS) of the first cell differs from a SCS of the second cell.
52. The apparatus of any preceding clause, wherein the first cell corresponds to a reference scheduling cell.
53. The apparatus of any preceding clause, wherein the second cell is identified as a cell into a set of cells for a subcarrier spacing (SCS) of the first cell.
54. The apparatus of any preceding clause, wherein the number of BDs and the number of CCEs in a slot of the first cell is a sum of the number of BDs and the number of CCEs for PDCCH candidates received in the first cell in the slot and a maximum number of BDs and CCEs for PDCCH candidates received in the second cell over all slots of the second cell that overlap with the slot of the first cell.
55. The apparatus of any preceding clause, wherein the PDCCH limit of the number of BDs and the number of CCEs in a slot of the first cell is identified based on a minimum of single cell limit for the first cell and a total PDCCH BD and CCE limit in a slot for a set of cells for the subcarrier spacing (SCS) of the first cell, wherein the total PDCCH BD and CCE limit in a slot for the set of cells for the SCS of the first cell is determined by a single cell limit for the first cell scaled by the reference number of cells for the SCS.
56. The apparatus of any preceding clause, wherein the one or more processors are configured to:
schedule the second cell by the first cell and the third cell, wherein the third cell is not a same cell as the second cell;
select a reference scheduling cell from at least one of the first cell, the second cell or the third cell; and
wherein the one or more processors are configured to determine the PDCCH limit includes determine the PDCCH limit based on a subcarrier spacing (SCS) of the reference scheduling cell.
57. The apparatus of any preceding clause, wherein the reference scheduling cell corresponds to a scheduling cell of a set of scheduling cells having a smallest SCS or a scheduling cell with a smallest SCS of all scheduling cells excluding the second cell.
58. The apparatus of any preceding clause, wherein the number of BDs and the number of CCEs in a slot of the reference scheduling cell for PDCCH candidates for the second cell is a sum of the maximum number of BDs and CCEs over all slots of a cell that schedules the second cell that overlap with the slot of the reference scheduling cell scaled by a ratio between the single cell PDCCH limit of the reference scheduling cell and the single cell PDCCH limit of the cell that schedules the second cell for all cells that schedule the second cell.
59. The apparatus of any preceding clause, wherein the PDCCH limit for the second cell and a total limit for a set of cells is identified within a slot of the reference scheduling cell.
60. A method of wireless communication at a user equipment (UE), comprising:
determining a physical downlink control channel (PDCCH) limit corresponding to at least one of a number of blind detections (BDs) and a number of control channel elements (CCEs) used for decoding PDCCH candidates for a first cell that schedules a second cell, and at least a third cell that schedules the second cell, wherein the third cell is the same cell as the second cell or the third cell is different from the second cell; and
receiving one or more PDCCH transmissions from the first cell and the third cell based on the PDCCH limit.
62. A method of wireless communication a network entity, comprising:
determining a physical downlink control channel (PDCCH) limit corresponding to at least one of a number of blind detections (BDs) and a number of control channel elements (CCEs) used for decoding PDCCH candidates for a first cell that schedules a second cell, and at least a third cell that schedules the second cell, wherein the third cell is the same cell as the second cell or the third cell is different from the second cell; and transmitting one or more PDCCH transmissions from the first cell and the third cell based on the PDCCH limit.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. An apparatus for wireless communication at a user equipment (UE), comprising:
    a transceiver;
    a memory configured to store instructions; and
    one or more processors communicatively coupled with the transceiver and the memory, wherein the one or more processors are configured to:
        determine a physical downlink control channel (PDCCH) limit, the PDCCH limit corresponding to at least one of a number of blind detections (BDs) and a number of control channel elements (CCEs) used for decoding PDCCH candidates for a first cell that schedules a second cell, and for at least a third cell that schedules the second cell; and
        receive one or more PDCCH transmissions from the first cell and the third cell based on the PDCCH limit.

2. The apparatus of claim 1, wherein the one or more processors are configured to at least one of forego reporting of a PDCCH BD carrier aggregation (CA) capability message or a total number of configured downlink cells being less than a reference number of downlink cells.

3. The apparatus of claim 1, wherein the third cell is a same cell as the second cell, the second cell is self-scheduled by itself and cross-carrier scheduled by the first cell.

4. The apparatus of claim 1, wherein a subcarrier spacing (SCS) of the first cell is identical to a SCS of the second cell.

5. The apparatus of claim 4, wherein the PDCCH limit corresponds to a maximum number of BDs and a maximum number of CCEs a user equipment (UE) is expected to process in a slot for decoding the PDCCH candidates for the second cell that are received in the first cell and the PDCCH candidates for the second cell in the slot that are received in the second cell, wherein the PDCCH limit is equal to a single cell PDCCH BD limit and CCE limit associated with the SCS.

6. The apparatus of claim 1, wherein the third cell is a same cell as the second cell and a subcarrier spacing (SCS) of the first cell differs from a SCS of the second cell.

7. The apparatus of claim 6, wherein the one or more processors are configured to at least one of forego reporting of a PDCCH BD carrier aggregation (CA) capability message or a total number of configured downlink cells being less than a reference number of downlink cells.

8. The apparatus of claim 1, wherein the second cell is self-scheduled by itself and cross-carrier scheduled by the first cell.

9. The apparatus of claim 1, wherein a first subset of parts of the PDCCH limit to the PDCCH candidates for the second cell received in the first cell and a second subset of parts of the PDCCH limit to the PDCCH candidates for the second cell received in the second cell are allocated in one or more slots of the second cell and one or more corresponding slots of the first cell.

10. The apparatus of claim 9, wherein a sum of the first subset of parts and the second subset of parts equals one in the one or more slots of the second cell and the one or more corresponding slots of the first cell.

11. The apparatus of claim 1, wherein a sum of a normalized number of BDs or CCEs in a slot normalized by a respective single cell limit in each pair of overlapping slots in both the first cell and the second cell is not larger than a threshold.

12. The apparatus of claim 1, wherein one of the first cell or the second cell corresponds to a reference scheduling cell.

13. The apparatus of claim 12, wherein a sum of the number of BDs or CCEs in a slot of the reference scheduling cell and a scaled number of BDs or CCEs in any slot of the first cell or the second cell that does not correspond to the reference scheduling cell that overlaps with the slot of the reference scheduling cell is not larger than a threshold.

14. The apparatus of claim 13, wherein the scaled number is based on a ratio between a single cell PDCCH limit of the reference scheduling cell and a single cell PDCCH limit of the first cell or the second cell that does not correspond to the reference scheduling cell.

15. The apparatus of claim 13, wherein the threshold corresponds to a single cell PDCCH BD and CCE limit of the reference scheduling cell associated with an SCS of the reference scheduling cell.

16. The apparatus of claim 12, wherein a sum of the number of BDs or CCEs in a slot of the reference scheduling cell and a maximum scaled number of BDs or CCEs in all slots of the first cell or the second cell that does not correspond to the reference scheduling cell that overlap with a corresponding slot of the first cell is not larger than a threshold.

17. The apparatus of claim 16, wherein the scaled number is based on a ratio between a single cell PDCCH limit of the reference scheduling cell and a single cell PDCCH limit of the first cell or the second cell that does not correspond to the reference scheduling cell.

18. The apparatus of claim 16, wherein the threshold corresponds to a single cell PDCCH BD and CCE limit of the reference scheduling cell associated with an SCS of the reference scheduling cell.

19. The apparatus of claim 12, wherein a SCS of the first cell or the second cell that does not correspond to the reference scheduling cell is equivalent to a SCS of the reference scheduling cell, and wherein determining the PDCCH limit includes determining the PDCCH limit based on the SCS of the reference scheduling cell or the SCS of the first cell or the second cell that does not correspond to the reference scheduling cell.

20. The apparatus of claim 19, wherein a subcarrier spacing (SCS) of the first cell differs from a SCS of the second cell.

21. The apparatus of claim 1, further comprising the third cell being a same cell as the second cell and reporting of a PDCCH BD carrier aggregation (CA) capability message and a total number of configured downlink cells being larger than a reference number of downlink cells, wherein the second cell is self-scheduled by itself and cross-carrier scheduled by the first cell.

22. The apparatus of claim 1, wherein the third cell is a same cell as the second cell or the third cell is different from the second cell.

23. The apparatus of claim 1, wherein the first cell corresponds to a reference scheduling cell.

24. The apparatus of claim 23, wherein the second cell is identified as a cell into a set of cells for a subcarrier spacing (SCS) of the first cell.

25. The apparatus of claim 23, wherein the number of BDs and the number of CCEs in a slot of the first cell is a sum of the number of BDs and the number of CCEs for PDCCH candidates received in the first cell in the slot and a maximum number of BDs and CCEs for PDCCH candidates received in the second cell over all slots of the second cell that overlap with the slot of the first cell.

26. The apparatus of claim 23, wherein the PDCCH limit of the number of BDs and the number of CCEs in a slot of the first cell is identified based on a minimum of single cell limit for the first cell and a total PDCCH BD and CCE limit in a slot for a set of cells for a subcarrier spacing (SCS) of the first cell, wherein the total PDCCH BD and CCE limit in a slot for the set of cells for the SCS of the first cell is determined by a single cell limit for the first cell scaled by a reference number of cells for the SCS.

27. The apparatus of claim 1, wherein the one or more processors are configured to:
schedule the second cell by the first cell and the third cell, wherein the third cell is not a same cell as the second cell;
select a reference scheduling cell from at least one of the first cell, the second cell or the third cell; and
wherein the one or more processors are configured to determine the PDCCH limit by determining the PDCCH limit based on a subcarrier spacing (SCS) of the reference scheduling cell.

28. The apparatus of claim 27, wherein the reference scheduling cell corresponds to a scheduling cell of a set of scheduling cells having a smallest SCS or a scheduling cell with a smallest SCS of all scheduling cells excluding the second cell.

29. The apparatus of claim 27, wherein the number of BDs and the number of CCEs in a slot of the reference scheduling cell for PDCCH candidates for the second cell is a sum of the maximum number of BDs and CCEs over all slots of a cell that schedules the second cell that overlap with the slot of the reference scheduling cell scaled by a ratio between a single cell PDCCH limit of the reference scheduling cell and a single cell PDCCH limit of the cell that schedules the second cell for all cells that schedule the second cell.

30. The apparatus of claim 27, wherein the PDCCH limit for the second cell and a total limit for a set of cells is identified within a slot of the reference scheduling cell.

31. An apparatus for wireless communication at a network entity, comprising:
a transceiver;
a memory configured to store instructions; and
one or more processors communicatively coupled with the transceiver and the memory, wherein the one or more processors are configured to:
determine a physical downlink control channel (PDCCH) limit, the PDCCH limit corresponding to at least one of a number of blind detections (BDs) and a number of control channel elements (CCEs) used for decoding PDCCH candidates for a first cell that schedules a second cell, and for at least a third cell that schedules the second cell; and
transmit one or more PDCCH transmissions from the first cell and the third cell based on the PDCCH limit.

32. The apparatus of claim 31, wherein the one or more processors are configured to at least one of receive reporting of a PDCCH BD carrier aggregation (CA) capability message or a total number of configured downlink cells being less than a reference number of downlink cells.

33. The apparatus of claim 31, wherein the third cell is a same cell as the second cell, the second cell is self-scheduled by itself and cross-carrier scheduled by the first cell.

34. The apparatus of claim 31, wherein a subcarrier spacing (SCS) of the first cell is identical to a SCS of the second cell.

35. The apparatus of claim 34, wherein the PDCCH limit corresponds to a maximum number of BDs and a maximum number of CCEs a user equipment (UE) is expected to process in a slot for decoding the PDCCH candidates for the second cell that are received in the first cell and the PDCCH candidates for the second cell in the slot that are received in the second cell, wherein the PDCCH limit is equal to a single cell PDCCH BD limit and CCE limit associated with the SCS.

36. The apparatus of claim 31, wherein the third cell is a same cell as the second cell and a subcarrier spacing (SCS) of the first cell differs from a SCS of the second cell.

37. The apparatus of claim 36, wherein the one or more processors are configured to at least one of receive reporting of a PDCCH BD carrier aggregation (CA) capability message or a total number of configured downlink cells being less than a reference number of downlink cells.

38. The apparatus of claim 31, wherein the second cell is self-scheduled by itself and cross-carrier scheduled by the first cell.

39. The apparatus of claim 31, wherein a first subset of parts of the PDCCH limit to the PDCCH candidates for the second cell received in the first cell and a second subset of parts of the PDCCH limit to the PDCCH candidates for the second cell received in the second cell are allocated in one or more slots of the second cell and one or more corresponding slots of the first cell.

40. The apparatus of claim 39, wherein a sum of the first subset of parts and the second subset of parts equals one in the one or more slots of the second cell and the one or more corresponding slots of the first cell.

41. The apparatus of claim 31, wherein a sum of a normalized number of BDs or CCEs in a slot normalized by a respective single cell limit in each pair of overlapping slots in both the first cell and the second cell is not larger than a threshold.

42. The apparatus of claim 31, wherein one of the first cell or the second cell corresponds to a reference scheduling cell.

43. The apparatus of claim 42, wherein a sum of the number of BDs or CCEs in a slot of the reference scheduling cell and a scaled number of BDs or CCEs in any slot of the first cell or the second cell that does not correspond to the reference scheduling cell that overlaps with the slot of the reference scheduling cell is not larger than a threshold.

44. The apparatus of claim 43, wherein the scaled number is based on a ratio between a single cell PDCCH limit of the reference scheduling cell and a single cell PDCCH limit of the first cell or the second cell that does not correspond to the reference scheduling cell.

45. The apparatus of claim 43, wherein the threshold corresponds to a single cell PDCCH BD and CCE limit of the reference scheduling cell associated with an SCS of the reference scheduling cell.

46. The apparatus of claim 42, wherein a sum of the number of BDs or CCEs in a slot of the reference scheduling cell and a maximum scaled number of BDs or CCEs in all slots of the first cell or the second cell that does not correspond to the reference scheduling cell that overlap with a corresponding slot of the first cell is not larger than a threshold.

47. The apparatus of claim 46, wherein the scaled number is based on a ratio between a single cell PDCCH limit of the reference scheduling cell and a single cell PDCCH limit of the first cell or the second cell that does not correspond to the reference scheduling cell.

48. The apparatus of claim 46, wherein the threshold corresponds to a single cell PDCCH BD and CCE limit of the reference scheduling cell associated with an SCS of the reference scheduling cell.

49. The apparatus of claim 42, wherein a SCS of the first cell or the second cell that does not correspond to the reference scheduling cell is equivalent to a SCS of the reference scheduling cell, and wherein determining the PDCCH limit includes determining the PDCCH limit based on the SCS of the reference scheduling cell or the SCS of the first cell or the second cell that does not correspond to the reference scheduling cell.

50. The apparatus of claim 31, further comprising the third cell being a same cell as the second cell and reporting of a PDCCH BD carrier aggregation (CA) capability message and a total number of configured downlink cells being larger than a reference number of downlink cells, wherein the second cell is self-scheduled by itself and cross-carrier scheduled by the first cell.

51. The apparatus of claim 50, wherein a subcarrier spacing (SCS) of the first cell differs from a SCS of the second cell.

52. The apparatus of claim 31, wherein the first cell corresponds to a reference scheduling cell.

53. The apparatus of claim 52, wherein the second cell is identified as a cell into a set of cells for a subcarrier spacing (SCS) of the first cell.

54. The apparatus of claim 52, wherein the number of BDs and the number of CCEs in a slot of the first cell is a sum of the number of BDs and the number of CCEs for PDCCH candidates received in the first cell in the slot and a maximum number of BDs and CCEs for PDCCH candidates received in the second cell over all slots of the second cell that overlap with the slot of the first cell.

55. The apparatus of claim 52, wherein the PDCCH limit of the number of BDs and the number of CCEs in a slot of the first cell is identified based on a minimum of single cell limit for the first cell and a total PDCCH BD and CCE limit in a slot for a set of cells for a subcarrier spacing (SCS) of the first cell, wherein the total PDCCH BD and CCE limit in a slot for the set of cells for the SCS of the first cell is determined by a single cell limit for the first cell scaled by a reference number of cells for the SCS.

56. The apparatus of claim 31, wherein the one or more processors are configured to:
    schedule the second cell by the first cell and the third cell, wherein the third cell is not a same cell as the second cell;
    select a reference scheduling cell from at least one of the first cell, the second cell or the third cell; and
    wherein the one or more processors are configured to determine the PDCCH limit by determining the PDCCH limit based on a subcarrier spacing (SCS) of the reference scheduling cell.

57. The apparatus of claim 56, wherein the reference scheduling cell corresponds to a scheduling cell of a set of scheduling cells having a smallest SCS or a scheduling cell with a smallest SCS of all scheduling cells excluding the second cell.

58. The apparatus of claim 56, wherein the number of BDs and the number of CCEs in a slot of the reference scheduling cell for PDCCH candidates for the second cell is a sum of the maximum number of BDs and CCEs over all slots of a cell that schedules the second cell that overlap with the slot of the reference scheduling cell scaled by a ratio between a single cell PDCCH limit of the reference scheduling cell and a single cell PDCCH limit of the cell that schedules the second cell for all cells that schedule the second cell.

59. The apparatus of claim 56, wherein the PDCCH limit for the second cell and a total limit for a set of cells is identified within a slot of the reference scheduling cell.

60. A method of wireless communication at a user equipment (UE), comprising:
    determining a physical downlink control channel (PDCCH) limit corresponding to at least one of a number of blind detections (BDs) and a number of control channel elements (CCEs) used for decoding PDCCH candidates for a first cell that schedules a second cell, and for at least a third cell that schedules the second cell; and
    receiving one or more PDCCH transmissions from the first cell and the third cell based on the PDCCH limit.

61. A method of wireless communication a network entity, comprising:
    determining a physical downlink control channel (PDCCH) limit corresponding to at least one of a number of blind detections (BDs) and a number of control channel elements (CCEs) used for decoding PDCCH candidates for a first cell that schedules a second cell, and for at least a third cell that schedules the second cell; and
    transmitting one or more PDCCH transmissions from the first cell and the third cell based on the PDCCH limit.

* * * * *